(12) United States Patent
Sinha et al.

(10) Patent No.: US 11,669,755 B2
(45) Date of Patent: Jun. 6, 2023

(54) DETECTING COGNITIVE BIASES IN INTERACTIONS WITH ANALYTICS DATA

(71) Applicant: Adobe Inc., San Jose, CA (US)

(72) Inventors: Atanu R Sinha, Bangalore (IN); Tanay Asija, Noida (IN); Sunny Dhamnani, Bangalore (IN); Raja Kumar Dubey, Durangi Khurd (IN); Navita Goyal, Bengaluru (IN); Kaarthik Raja Meenakshi Viswanathan, Nambiyur (IN); Georgios Theocharous, San Jose, CA (US)

(73) Assignee: Adobe Inc., San Jose, CA (US)

( * ) Notice: Subject to any disclaimer, the term of this patent is extended or adjusted under 35 U.S.C. 154(b) by 368 days.

(21) Appl. No.: 16/921,202

(22) Filed: Jul. 6, 2020

(65) Prior Publication Data
US 2022/0004898 A1 Jan. 6, 2022

(51) Int. Cl.
*G06N 5/04* (2023.01)
*G06N 20/00* (2019.01)
*G06F 9/451* (2018.01)

(52) U.S. Cl.
CPC ............ *G06N 5/04* (2013.01); *G06F 9/451* (2018.02); *G06N 20/00* (2019.01)

(58) Field of Classification Search
CPC .......... G06N 5/04; G06N 20/00; G06F 9/451
USPC ......................................................... 706/12
See application file for complete search history.

(56) References Cited

U.S. PATENT DOCUMENTS

| 6,901,448 B2* | 5/2005 | Zhu ................ G06Q 10/10 709/227 |
| 10,645,294 B1* | 5/2020 | Manzari .......... H04N 5/232127 |
| 2014/0176665 A1* | 6/2014 | Gottlieb ............... H04L 65/403 709/204 |
| 2014/0229866 A1* | 8/2014 | Gottlieb ............... G06F 3/0486 709/204 |
| 2015/0334142 A1* | 11/2015 | Gottlieb .......... H04N 21/47205 715/753 |
| 2018/0240010 A1* | 8/2018 | Faivishevsky ....... G06N 3/0454 |

(Continued)

OTHER PUBLICATIONS

Dzmitry Bahdanau, Kyunghyun Cho, and Yoshua Bengio. Neural machine translation by jointly learning to align and translate. CoRR, abs/1409.0473 (2014).

(Continued)

*Primary Examiner* — William D Titcomb
(74) *Attorney, Agent, or Firm* — Keller Preece PLLC

(57) ABSTRACT

The present disclosure relates to methods, systems, and non-transitory computer-readable media for determining a cognitive, action-selection bias of a user that influences how the user will select a sequence of digital actions for execution of a task. For example, the disclosed systems can identify, from a digital behavior log of a user, a set of digital action sequences that correspond to a set of sessions for a task previously executed by the user. The disclosed systems can utilize a machine learning model to analyze the set of sessions to generate session weights. The session weights can correspond to an action-selection bias that indicates an extent to which a future session for the task executed by the user is predicted to be influenced by the set of sessions. The disclosed systems can provide a visual indication of the action-selection bias of the user for display on a graphical user interface.

20 Claims, 15 Drawing Sheets

(56) References Cited

U.S. PATENT DOCUMENTS

| | | | | |
|---|---|---|---|---|
| 2018/0240040 A1* | 8/2018 | Morimura | .............. | G06Q 30/02 |
| 2019/0191126 A1* | 6/2019 | Gottlieb | ............. | H04N 21/4316 |
| 2020/0118029 A1* | 4/2020 | DeBraal | ............. | G06Q 30/0201 |
| 2020/0349608 A1* | 11/2020 | Liang | ................. | G06Q 30/0261 |
| 2021/0004700 A1* | 1/2021 | Prabhu | ................... | G06N 20/20 |
| 2021/0065040 A1* | 3/2021 | Eberlein | .......... | G06Q 10/06393 |
| 2021/0097768 A1* | 4/2021 | Malia | .................... | G06F 3/0488 |

OTHER PUBLICATIONS

Michael M Pompian. Behavioral finance and wealth management: how to build investment strategies that account for investor biases, vol. 667. John Wiley & Sons, 2011.

Yang Song, Hongning Wang, and Xiaodong He. Adapting deep ranknet for personalized search. In Proceedings of the 7th ACM International Con ference on Web Search and Data Mining, WSDM '14, p. 83-92, New York, NY, USA, 2014. Association for Computing Machinery.

Mengwei Xu, Feng Qian, Qiaozhu Mei, Kang Huang, and Xuanzhe Liu. Deeptype: On-device deep learning for input personalization service with minimal privacy concern. Proceedings of the ACM on Interactive, Mobile, Wearable and Ubiquitous Technologies, 2:1-26, Dec. 2018.

Nicholas Barberis and Richard Thaler. A survey of behavioral finance. Handbook of the Economics of Finance, 1:1053-1128, 2003.

Elias Bareinboim and Judea Pearl. Controlling selection bias in causal inference. In Artificial Intelligence and Statistics, pp. 100-108, 2012.

Yoshua Bengio Dzmitry Bahdanau, Kyunghyun Cho. Neural machine translation by jointly learning to align and translate. arXiv:1409.0473 [cs.CL], 2016.

Martie G Haselton, Daniel Nettle, and Damian R Murray. The evolution of cognitive bias. The handbook of evolutionary psychology, pp. 1-20, 2015.

Martin Hilbert. Toward a synthesis of cognitive biases: how noisy information processing can bias hu-man decision making. Psychological bulletin, 138(2):211, 2012.

Research IBM. Bias in ai: How we build fair ai systems and less-biased humans, https://www.research.ibm.com/5-in-5/ai-and-bias/, https://www. ibm.com/blogs/policy/bias-in-ai/, Feb. 2018.

Tomas Kliegr, Stepan Bahnik, and Johannes Furnkranz. A review of possible effects of cognitive biases on interpretation of rule-based machine learning models. arXiv preprint arXiv:1804.02969, 2018.

Will Knight. Microsoft is creating an oracle for catching biased ai algorithms. https://www.technologyreview.com/s/611138/microsoft- is-creating-an-oracle-for-catching-biased-ai-algorithms/, May 2018.

Minyong R Lee and Milan Shen. Winner's curse: Bias estimation for total effects of features in online controlled experiments. In Proceedings of the 24th ACM SIGKDD International Conference on Knowledge Discovery & Data Mining, pp. 491-499. ACM, 2018.

Brian Mac Namee, Padraig Cunningham, Stephen Byrne, and Owen I Corrigan. The problem of bias in training data in regression problems in medical decision support. Artificial intelligence in medicine, 24(1):51-70, 2002.

Ninareh Mehrabi, Fred Morstatter, Nripsuta Saxena, Kristina Lerman, and Aram Galstyan. A survey on bias and fairness in machine learning. arXiv preprint arXiv:1908.09635, 2019.

Matthew Rabin and JoelL Schrag. First impressions matter: A model of confirmatory bias. The quarterly journal of economics, 114(1):37-82, 1999.

Matthew Rabin. Psychology and economics. Journal of economic literature, 36(1):11-46, 1998.

Jean-Baptiste Remy, Antoine Jean-Pierre Tixier, and Michalis Vazirgiannis. Bidirectional context-aware hierarchical attention network for document understanding, 2019.

Amos Tversky and Daniel Kahneman. Judgment under uncertainty: Heuristics and biases. science, 185(4157):1124-1131, 1974.

Yixin Wang and David M Blei. Multiple causes: A causal graphical view. arXiv preprint arXiv:1905.12793, 2019.

Yilin Wang, Suhang Wang, Jiliang Tang, Neil O'Hare, Yi Chang, and Baoxin Li. Hierarchical attention network for action recognition in videos. CoRR, abs/1607.06416, 2016.

Yixin Wang, Dawen Liang, Laurent Charlin, and David M Blei. The deconfounded recommender: A causal inference approach to recommendation. arXiv preprint arXiv:1808.06581, 2018.

Yang, Zichao et al.; Hierarchical attention networks for document classification. Proceedings of the 2016 conference of the North American chapter of the association for computational linguistics: human language technologies, 2016.

* cited by examiner

DETECTING COGNITIVE BIASES IN INTERACTIONS WITH ANALYTICS DATA

BACKGROUND

In recent years, data analysis systems have improved software platforms for analyzing digital data and extracting insights from the analysis. For example, many systems provide an analytics user interface that facilitates data selection, model implementation, action execution, and report generation for data analysis. Some systems can further examine a particular analytical approach (including the model(s) or data used to perform a data analysis) to identify potential biases associated with the approach that may affect the insights extracted from the data but fail to identify cognitive biases. Accordingly, these systems can facilitate the removal of biases found in a model or data and improve the analysis of data accordingly.

Despite these advances, however, conventional data analysis systems suffer from several technological shortcomings. For example, as mentioned, conventional data analysis systems often provide an analytics user interface with which a user (e.g., an analyst) can interact to perform certain analytical tasks. Such conventional systems may allow a user to interact with a user interface to select various digital actions that, when executed in combination, result in completion of a particular task. Some such systems, however, are often configured in a way that encourages the user to select the same sequence of digital actions for a particular task, resulting in a narrow and biased approach to data analysis. In contrast to biases influenced by a system's configuration, human behavior (e.g., rooted in a psychological basis) can lead users to select digital actions in accordance with personally-held cognitive biases. Conventional systems typically fail to deter or at least recognize adherence to these cognitive biases.

Additionally, conventional data analysis systems can also operate inflexibly. For example, though conventional data analysis systems can examine analytical approaches to identify potential biases, such systems are often limited to the detection of biases that are inherent to the data to be analyzed or the model(s) used for the analysis. Indeed, these systems often fail to detect analytical defects that extend beyond these types of biases, such as by failing to detect defects caused by cognitive biases associated with the user performing the analysis. Such systems risk performing a data analysis that suffers from these undetected biases. While there have been previous efforts to explore other types of biases, outside of cognitive biases, that may affect an approach to data analysis, these efforts fail to address human cognitive bias that can affect how a user performs data analysis. Further, these efforts have largely been limited to human experimental studies that posit various scenarios to a subject and elicit responses accordingly. Such an approach, however, is not scalable.

SUMMARY

This disclosure describes one or more embodiments of methods, non-transitory computer-readable media, and systems that solve one or more of the foregoing problems and provide other benefits. For example, in one or more embodiments, the disclosed systems analyze, utilizing a machine learning model, previously-observed digital action sequences selected by a user when executing a particular task to generate weights that indicate an action-selection bias of the user. Indeed, the disclosed systems can utilize the weights to indicate a cognitive bias—such as an anchoring bias or a recency bias—that influences how the user will select a sequence of digital actions for future execution of the task. In one or more embodiments, the disclosed systems generate a visual indication that can include, for instance, a visual representation of the weights (e.g., in graph-form) or a prompt (e.g., provided via an intelligent agent) encouraging the user to select a different sequence of digital actions. Thus, the disclosed systems introduce an unconventional approach that utilizes machine learning to flexibly identify biases that affect a user's action-selection process and the results derived from that process. In some cases, the disclosed systems can identify such biases to facilitate improving a user's work to correct for cognitive biases.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures.

DETAILED DESCRIPTION

Figure 1:
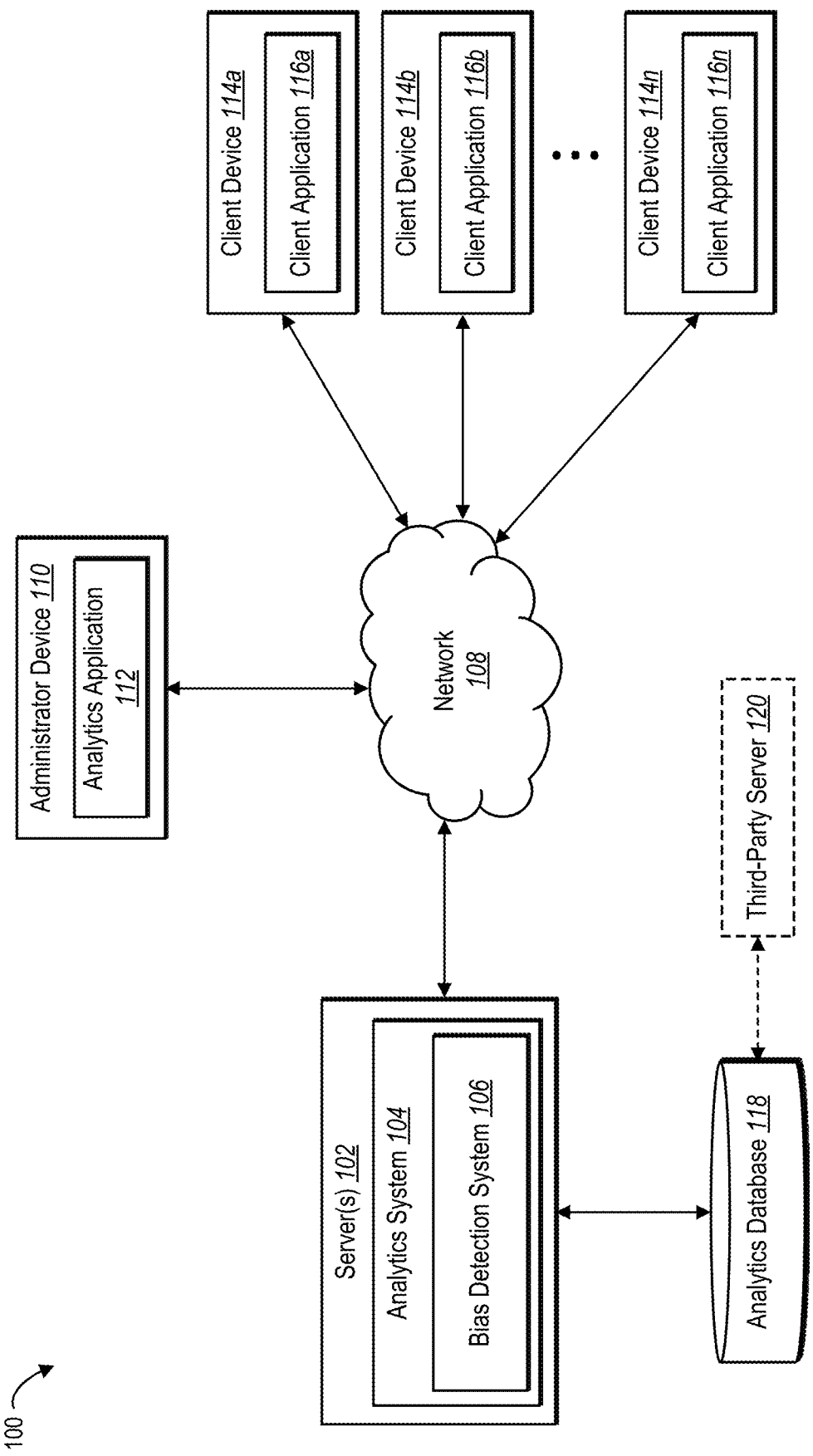
FIG. 1 illustrates an example system environment in which a bias detection system can operate in accordance with one or more embodiments.

The disclosure describes one or more embodiments of a bias detection system utilizing machine learning to identify how a user depends on previous executions of a task when selecting digital actions for a subsequent execution of the task. For example, the bias detection system can utilize a machine learning model to analyze sequences of digital actions previously selected by a user to execute a particular task. The bias detection system can utilize the machine learning model to generate various weights assigned to the previous executions of the task based on the analysis. These weights can represent, for example, a cognitive bias that indicates that the user relies on early executions of the task (e.g., anchoring bias) or more recent executions of the task (e.g., recency bias) when selecting a sequence of digital actions for a subsequent execution of the task. The disclosed systems can inform the user (e.g., via a graph or notification displayed within a graphical user interface) of the action-selection bias indicated by the weights.

To provide an illustration, in one or more embodiments, the bias detection system identifies, from a digital behavior log corresponding to a user, a set of digital action sequences corresponding to a set of sessions for a task executed by the user. The bias detection system can generate, utilizing a machine learning model, session weights indicating an extent a future session for the task is predicted to be influenced by the set of sessions. Based on the session weights, the bias detection system can provide a visual indication of an action-selection bias of the user for the task for display on a graphical user interface.

As just mentioned, in one or more embodiments, the bias detection system identifies a set of digital action sequences that correspond to a set of sessions for a task (e.g., the same task) from a digital behavior log associated with a user. Indeed, the bias detection system can maintain a digital behavior log for a user that stores the digital actions selected by the user (e.g., via a user interface) when executing tasks. In some instances, the bias detection system identifies a digital action sequence corresponding to a session for a task by identifying, within the digital behavior log, a task-identifying digital action (e.g., a digital action that is unique to the particular task) and building a context by selecting digital actions that precede and follow the task-identifying digital action.

Further, as mentioned, in one or more embodiments, the bias detection system generates session weights utilizing a machine learning model. In particular, the bias detection system can utilize the machine learning model to generate the session weights based on the set of sessions (e.g., the corresponding set of digital action sequences) identified from the digital behavior log of the user. In some instances, the machine learning model analyzes the set of sessions using rolling windows of sessions where each window includes a session that immediately follows the sessions of the preceding window. More specifically, in some cases, each subsequent window can include the following session and drop the first session of the previous window.

In one or more embodiments, the machine learning model includes a neural network, such as an attention neural network. For example, the machine learning model can include a hierarchical attention neural network that performs an action-level analysis and a task-level analysis on the set of sessions (e.g., the corresponding set of digital action sequences) identified from the digital behavior log. Accordingly, in some embodiments, the session weights include the attention weights generated by the attention neural network.

The session weights can indicate a predicted degree to which the user will rely on the set of sessions for future execution of the task. For example, the session weights can indicate that future execution of the task is predicted to be based on a particular action-selection bias—such as an anchoring bias or a recency bias—of the user. In other words, in some embodiments, the bias detection system determines that, when a user selects a digital action sequence for execution of a task, the user bases the selection on previous digital action sequences selected by the user for previous sessions for the task—or, at least, selects digital actions consistent with one or more of those previous sessions for the task. Thus, in some embodiments, the bias detection system can utilize the session weights to generally indicate whether the user is biased in favor of earlier sessions for the task or later sessions for the task previously executed by the user when selecting a digital action sequence for subsequent execution of the task.

In some embodiments, the bias detection system accounts for common digital action sequences or sub-sequences selected for execution of a task when generating the session weights. Indeed, some tasks may require selection of certain digital actions (e.g., sequences or sub-sequences of digital actions), or standard practice may dictate selection of certain digital actions. Accordingly, the bias detection system can detect and account for such commonly selected digital actions (as not indicating cognitive bias) when generating or updating session weights tailored to a particular user.

Additionally, as mentioned above, in one or more embodiments, the bias detection system provides a visual indication of the action-selection bias of the user. For example, the bias detection system can generate a graphical representation of the session weights indicating the action-selection bias (e.g., a graph of the values of the session weights). As another example, the bias detection system can generate a notification for display (e.g., via a virtual assistant or other intelligent agent) to the user in response to detecting that the user is selecting one or more digital actions for a task in a sequence consistent with the action-selection bias of the user. Thus, the bias detection system can inform the user of certain biases that affect the digital action sequences selected by the user to execute a task.

The bias detection system provides several advantages over conventional systems. For example, the bias detection system introduces an unconventional approach for identifying biases that affect how users select sequences of digital actions when executing tasks. Indeed, the bias detection system utilizes an unconventional ordered combination of actions for determining an action selection-bias of a user based on session weights generated by a machine learning model analyzing previously-observed data of the user (e.g., from a digital behavior log of the user) and providing a visual indication of that action-selection bias. In other words, the bias detection system introduces a process for identifying an action-selection bias of a user that is not utilized by conventional systems. Thus, the bias detection system can encourage users to select a different sequence of digital actions when executing a task to obtain different results and/or new insights into the data. Further, by utilizing a machine learning model to generate the session weights, the bias detection system generates bias-indicative values that could not be determined by humans. For example, the bias detection system can generate feature vectors (e.g., action-level context vectors or session-level context vectors) that include values that represent latent features corresponding to digital action sequences selected by a user.

Further, by providing indications of biases that affect selection of digital actions used in executing a task, the bias detection system can operate more flexibly than conventional systems. Indeed, the bias detection system can identify and provide visual indications for biases that extend beyond those that are inherent to the digital data analyzed or the model(s) used to perform the analysis. By utilizing a machine learning model to generate the sessions weights upon which the visual indication of the action-selection bias is based, the bias detection system further provides improved scalability with regard to the identification of such biases compared to previous efforts. Indeed, the bias detection system offers a practical solution for determining the action-selection biases of a large number of users—while detecting the action-selection biases for each user individually—by analyzing digital action sequences previously selected by those users. Further, by analyzing previously-selected digital action sequences, the bias detection system can operate passively in many instances (e.g., without engaging the user), allowing for an analytical approach that is independent of user availability.

As illustrated by the foregoing discussion, the present disclosure utilizes a variety of terms to describe features and benefits of the bias detection system. As used herein, the term "digital action" refers to an action executed using a computing device. In particular, a digital action can refer to an action performed by a user of a computing device, using functions and features of the computing device. For example, a digital action can include an action related to analyzing digital data (e.g., via an analytics user interface), such as launching a project, dragging-and-dropping one or more components, building a segment, saving a segment, clicking a node, calculating a value, generating a report, or interacting with a report. However, a digital action can include an action other than those in the context of digital data analysis. For example, a digital action can include an action related to generating, viewing, or editing a digital image or digital video or a digital action related to conducting a search or navigating a website.

Relatedly, as used herein, the term "digital action sequence" refers to a group of sequentially-ordered digital actions. In particular, a digital action sequence can refer to a plurality of digital actions that were selected by a user and are ordered based on the order in which those digital actions were selected or executed. In one or more embodiments, a digital action sequence corresponds to a particular task. For example, a digital action sequence can include a set of all digital actions or a subset of digital actions selected or executed to complete a task. In some embodiments, however, a sequence of digital actions corresponds to multiple tasks. As used herein, the term "predicted digital action sequence" refers to a digital action sequence predicted to be selected by a user for completion of a task. As used herein, the term "observed digital action sequence" refers to a previous (e.g., recorded) digital action sequence selected by a user for completion of a task. In one or more embodiments, the bias detection system can utilize an observed digital action sequence of as a ground truth for comparison with a predicted digital action sequence in adjusting the session weights of a machine learning model.

Additionally, as used herein, the term "digital behavior log" refers to a digital log of digital actions executed by a user. In particular, a digital behavior log can refer to a digital record that stores digital actions executed by a client device associated with the user (e.g., in response to input from the user and/or under a user profile associated with the user). A digital behavior log can include a digital record that stores a chronological list of digital actions or otherwise includes a timed record of digital actions selected by a user via one or more platforms, operating systems, computer applications, and/or user interfaces.

Further, as used herein, the term "task" refers to an objective that is completed via performance of a plurality of digital actions by a computing device based on user input. In particular, a task can refer to a function or operation that is completed (e.g., executed) or performed by a computing device as a result of performance of a plurality of digital actions or that becomes available for completion after performance of the plurality of digital actions. In other words, a task can refer to an objective and can be composed of one or more digital actions selected and/or performed to complete (e.g., execute) that objective. For example, a task can include performance of an analysis of digital data, such as building a segment of users, a segmentation analysis, or a contribution analysis. As another example, a task can include generating, viewing, or editing a digital image or digital video or at least a portion of a digital image or a digital video. A task can also include conducting a search or navigating a website.

Additionally, as used herein, the term "task-identifying digital action" refers to a digital action that can be used to detect or otherwise identify a task. For example, a task-identifying digital action can include a digital action that is unique to a particular task or is otherwise designated as useful for identifying (or indicative of) a particular task.

As used herein, the term "session" refers to an instance of executing a task and a corresponding digital action sequence. In particular, a session can refer to a distinct occasion in which a user selects one or more digital actions for execution to complete a task. For example, a session can refer to an instance of executing a task that is distinguishable (e.g., distinct in time) from another instance of executing the same task. As used herein, the term "set of sessions" refers to a collection of multiple sessions. For example, a set of sessions can refer to a chronological grouping of sessions for a task (e.g., the same task) where a given session chronologically precedes the immediately following session in the set and/or chronologically follows the immediately preceding session in the set. In some embodiments, the bias detection system determines the chronological order for sessions for a task based on the order in which those sessions appear within the digital behavior log of the corresponding user (or based on a timestamp associated with each of the sessions within the digital behavior log).

Additionally, as used herein, the term "rolling windows of sessions" refers to overlapping sets of sessions for a task. In particular, rolling windows of sessions can refer to a collection of various sets of sessions for a task where each "window" corresponds to a set of sessions, and the rolling windows of sessions, as a whole, progresses through the various sets of sessions in the collection. Each window can overlap with at least one other window by including one or more sessions included in the at least one other window. For example, a given window can include all but one session included in the adjacent (e.g., preceding or subsequent) window. In one or more embodiments, the bias detection system establishes rolling sessions of windows based on a chronological order. To illustrate, the bias detection system can order a collection of sessions for a task (e.g., and corresponding to the same user) chronologically. Thus, the windows roll (i.e., progress) through the collection of sets of sessions chronologically.

Further, as used herein, the term "action-selection bias" refers to a bias associated with a user that indicates the extent to which actions previously selected by the user influence a future selection of actions by the user. In particular, an action-selection bias can refer to a cognitive bias that indicates the extent to which digital actions selected during previous sessions for a task executed by a user influence the selection of digital actions by the user in a future session of the same task. An action-selection bias can more particularly refer to an action-selection bias that indicates the extent to which digital action sequences associated with previous sessions for a task executed by a user influence a digital action sequence selected by the user in a future session of the same task. In one or more embodiments, an action-selection bias recognizes and accounts for selections of digital actions common or standard to a task (e.g., required by the task or standard practice for the task) and detects a cognitive bias indicated by selected actions beyond such common or standard action subsequences. An action-selection bias can include, for example, a cognitive bias, such as an anchoring bias or a recency bias. But an action-selection bias does not refer to a bias created by a model specification or the selections made by a human in designing a model. As used herein, the term "anchoring bias" refers to a bias in which early (e.g., initial) sessions for a task executed by a user have a relatively greater influence on future executions of the task by the user than later (e.g. more recent) sessions. By comparison, as used herein, the term "recency bias" refers to a bias in which later sessions for a task executed by a user have a relatively greater influence on future executions of the task by the user.

As used herein, a "machine learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

As mentioned, a machine learning model can include a neural network. As used herein, the term "neural network" refers to a machine learning model that includes a model of interconnected artificial neurons (organized in layers) that communicate and learn to approximate complex functions and generate outputs based on a plurality of inputs provided to the model. In addition, a neural network can comprise an algorithm (or set of algorithms) that implements deep learning techniques that utilize a set of algorithms to model high-level abstractions in data.

A neural network can include an attention neural network. As used herein, the term the term "attention neural network" can refer to a neural network having one or more attention features. In particular, an attention neural network can refer to a neural network having one or more attention mechanisms (e.g., attention layers). In some embodiments, an attention neural network includes a hierarchical attention model. As used herein, the term "attention mechanism" refers to a neural network component that generates values corresponding to attention-controlled features. In particular, an attention mechanism can generate values based on one or more hidden states (e.g., an output state and/or a final state). For example, an attention mechanism can be trained to control access to memory, allowing certain features to be stored and later access while processing neural network inputs to learn the context of a given input (i.e., a given hidden state corresponding to the input) without relying solely on that input. In one or more embodiments, an attention mechanism corresponds to a particular neural network layer and processes the outputs (e.g., the output states) generated by the neural network layer.

As used herein, the term "action-level encoder" refers to a neural network encoder that performs an action-level analysis on a representation of a digital action sequence. In particular, an action-level encoder can refer to a neural network encoder that analyzes encoded representations of digital actions individually. As used herein, the term "action-level context vector" refers to a vector of values (e.g., latent or hidden values) generated by an action-level encoder (e.g., based on an analysis of the digital actions of a digital action sequence).

Further, as used herein, the term "session-level encoder" refers to a neural network encoder that performs a session-level analysis on a representation of a digital action sequence. In particular, a session-level encoder can refer to a neural network encoder that analyzes an encoded representation of a digital action sequence as a whole. As used herein, the term "session-level context vector" refers to a vector of values (e.g., latent or hidden values) generated by a session-level encoder (e.g., based on an analysis of a digital action sequence of as a whole).

As further used herein, the term "session weight" refers to a value that corresponds to one or more sessions for a task. In particular, a session weight can refer to a value that is generated using a machine learning model and indicates the extent to which one or more corresponding sessions of a task influence a future session for the task. For example, a session weight can include a machine learning model weight (e.g., a weight internal to the machine learning model) that is generated (e.g., learned) by analyzing digital action sequences for a task previously selected by one or more users. As indicated above, a session weight can indicate an extent a future session for a task is predicted to be influenced by a set of sessions—beyond an influence from an action sequence from past sessions required or standardized by a task or by an analysis guided by a user interface. A session weight can accordingly exclude influence from selections of digital actions that are common or standard to a task.

Additionally, as mentioned above, a machine learning model can include a neural network, such as an attention neural network. Accordingly, in one or more embodiments, a session weight can include an attention weight. As used herein, the term "attention weight" refers to a session weight generated using an attention neural network. In particular, an attention weight can refer to a session weight generated using a neural attention mechanism of an attention neural network. Relatedly, as used herein, the term "baseline attention weight" more particularly refers to an attention weight that is generated (e.g., learned) by analyzing digital action sequences for a task previously selected by a plurality of users. Indeed, a baseline attention weight can refer to a value generated by an attention mechanism that represents one or more characteristics or features associated with a task that lead to the commonalities in the digital action sequences selected by the plurality of users. Thus, the bias detection system can compare an attention weight that corresponds to a particular user with a corresponding baseline attention weight to determine how the user deviates from a baseline.

As used herein, the term "visual indication" refers to a visual element that can be displayed on a computing device. In particular, a visual indication refers to a visual component that can be displayed on a client device in association with underlying data, such as session weights generated by a machine learning model. For example, a visual indication can include a graphical indication (e.g., a visual indication having a graphics element) or, more particular, a graphical representation (e.g., a graph, a chart, a table, a diagram, a heat map) of the underlying data. In some embodiments, a visual indication is interactable. In other words, in response to receiving an interaction with the visual indication, the bias detection system can provide additional information (e.g., via one or more additional visual indications) or perform some other operation.

Additionally, as used herein, the term "frequency of a digital action" refers to selections of a digital action during a session for a task. For example, a frequency of a digital action can refer to a total number of selections of a digital action during a session for a task or a fraction of selections out of all selections made during the session for the task that were directed to the digital action. As used herein, the term "frequency heat map" refers to a heat map that displays the frequencies of digital actions across one or more sessions for a task.

Additional detail regarding the bias detection system will now be provided with reference to the figures. For example, FIG. 1 illustrates a schematic diagram of an exemplary system 100 in which a bias detection system 106 can be implemented. As illustrated in FIG. 1, the system 100 can include a server(s) 102, a network 108, an administrator device 110, client devices 114a-114n, an analytics database 118, and a third-party server 120.

Although the system 100 of FIG. 1 is depicted as having a particular number of components, the system 100 can have any number of additional or alternative components (e.g., any number of servers, administrator devices, client devices, analytics databases, third-party servers, or other components in communication with the bias detection system 106 via the network 108). Similarly, although FIG. 1 illustrates a particular arrangement of the server(s) 102, the network 108, the administrator device 110, the client devices 114a-114n, the analytics database 118, and the third-party server 120, various additional arrangements are possible.

The server(s) 102, the network, 108, the administrator device 110, the client devices 114a-114n, the analytics database 118, and the third-party server 120 may be communicatively coupled with each other either directly or indirectly (e.g., through the network 108 discussed in greater detail below in relation to FIG. 10). Moreover, the server(s) 102, the administrator device 110, the client devices 114a-114n, and the third-party server 120 may include a variety of computing devices (including one or more computing devices as discussed in greater detail with relation to FIG. 10).

As mentioned above, the system 100 includes the server(s) 102. The system 100 can generate, store, receive, and/or transmit digital data, including digital data related to digital actions and action-selection biases. For example, the server(s) 102 can receive (e.g., from the third-party server 120) a digital behavior log that includes digital actions selected by a user to execute one or more tasks and provide a visual indication of an action-selection bias of the user for display on a client device (e.g., one of the client devices 114a-114n). In one or more embodiments, the server(s) 102 comprise a data server. The server(s) 102 can also comprise a communication server or a web-hosting server.

As shown in FIG. 1, the server(s) 102 can include an analytics system 104. In particular, the analytics system 104 can collect, manage, and/or utilize analytics data. For example, the analytics system 104 can collect analytics data related to digital actions selected by users to execute a task. The analytics system 104 can collect the analytics data in a variety of ways. For example, in one or more embodiments, the analytics system 104 causes the server(s) 102 to track digital actions selected by users via the client devices 114a-114n and report the digital actions for storage (e.g., in the form of a digital behavior log) on a database (e.g., the analytics database 118). In some embodiments, the third-party server 120 tracks the digital actions and stores them within the analytics database 118; accordingly, the analytics system 104 can retrieve the digital actions tracked by the third-party server 120 from the analytics database 118.

In some embodiments, the analytics system 104 receives the analytics data directly from the client devices 114a-114n. For example, the analytics system 104 can provide a user interface through which the client devices 114a-114n can select digital actions (e.g., an analytics user interface through which the client devices 114a-114n can select digital actions to perform data analysis). The analytics system 104 can receive or otherwise detect the digital action selections made by the client devices 114a-114n and store the selected digital actions in the analytics database 118. It should be noted, however, that the bias detection system 106 is not limited to the context of digital actions selected to perform data analysis. Indeed, the bias detection system 106 can similarly collect, manage, and/or utilize digital actions selected for a variety of purposes.

Additionally, the server(s) 102 include the bias detection system 106. In particular, in one or more embodiments, the bias detection system 106 utilizes the server(s) 102 to analyze digital action sequences corresponding to tasks executed by users and generate visual indications of task-selection biases of those users. For example, the bias detection system 106 can utilize the server(s) 102 to identify digital action sequences corresponding to a task executed by a user and, based on those digital action sequences, generate a visual indicator of an action-selection bias of the user.

To illustrate, in one or more embodiments, the bias detection system 106, via the server(s) 102, identifies, from a digital behavior log associated with a user, a set of digital action sequences corresponding to a set of sessions for a task executed by the user. Via the server(s) 102, the bias detection system 106 can utilize a machine learning model to generate sessions weights that indicate an extent to which a future session for the task is predicted to be influenced by the set of sessions. The bias detection system 106, via the server(s) 102, can further provide a visual indication of an action-selection bias of the user for the task for display on a graphical user interface based on the generated session weights.

In one or more embodiments, the analytics database 118 stores digital data related to digital actions selected by users for execution of one or more tasks. For example, the analytics database 118 can store digital behavior logs corresponding to users, where the digital behavior log of a particular user includes digital data related to digital actions selected by the user for execution of one or more tasks. Though FIG. 1 illustrates the analytics database 118 as a distinct component, one or more embodiments include the analytics database 118 as a component of the server(s) 102, the analytics system 104, or the bias detection system 106.

In one or more embodiments, the third-party server 120 tracks, detects, or otherwise identifies digital actions selected by users, via client devices, for the execution of one or more tasks. For example, in one or more embodiments, the third-party server 120 can be accessed by a client device (e.g., one of the client devices 114a-114n) to select digital actions for the execution of one or more tasks. Indeed, like the analytics system 104, the third-party server 120 can provide a user interface through which the client devices 114a-114n can select digital actions (e.g., an analytics user interface through which the client devices 114a-114n can select digital actions to perform data analysis).

In one or more embodiments, the administrator device 110 includes a computing device that can access and display digital data related to the action-selection biases of users. For example, the administrator device 110 can include a smartphone, a tablet, a desktop computer, a laptop computer, a head-mounted display device, or another electronic device. The administrator device 110 can include one or more applications (e.g., the analytics application 112) that can access and display digital data related to the action-selection biases of users. For example, the analytics application 112 can include a software application installed on the administrator device 110. Additionally, or alternatively, the analytics application 112 can include a software application hosted on the server(s) 102, which may be accessed by the administrator device 110 through another application, such as a web browser.

In one or more embodiments, the client devices 114a-114n include computing devices that can select digital actions for execution of one or more tasks. For example, the client devices 114a-114n can include smartphones, tablets, desktop computers, laptop computers, head-mounted-display devices, or other electronic devices. The client devices 114a-114n can include one or more applications (e.g., client applications 116a-116n, respectively) that can select digital actions for execution of one or more tasks. For example, the client applications 116a-116n can each include a software application respectively installed on the client devices 114a-114n. Additionally, or alternatively, the client applications 116a-116n can each include a web browser or other application that accesses a software application hosted on the server(s) 102.

The bias detection system 106 can be implemented in whole, or in part, by the individual elements of the system 100. Indeed, although FIG. 1 illustrates the bias detection system 106 implemented with regard to the server(s) 102, different components of the bias detection system 106 can be implemented by a variety of devices within the system 100. For example, one or more (or all) components of the bias detection system 106 can be implemented by a different computing device (e.g., one of the client devices 114a-114n) or a separate server from the server(s) 102 hosting the analytics system 104 (e.g., the third-party server 120). Example components of the bias detection system 106 will be described below with regard to FIG. 8.

Figure 2:
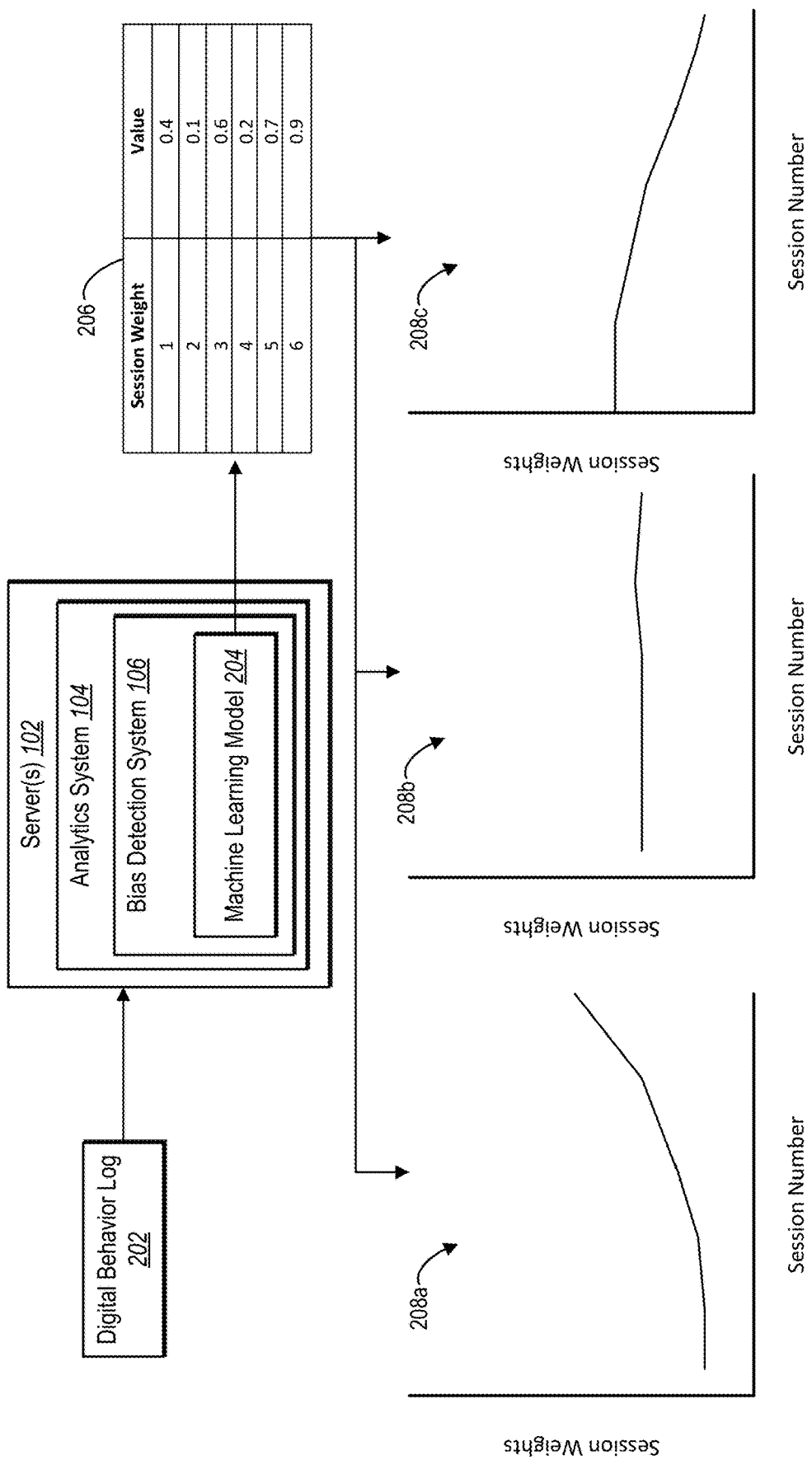
FIG. 2 illustrates an overview diagram of the bias detection system generating a visual indication of an action-selection bias of a user in accordance with one or more embodiments.

As mentioned above, the bias detection system 106 can generate a visual indication of an action-selection bias of a user. FIG. 2 illustrates an overview diagram of the bias detection system 106 generating a visual indication of an action-selection bias of a user in accordance with one or more embodiments.

As shown in FIG. 2, the bias detection system 106 identifies a digital behavior log 202 corresponding to a user. In one or more embodiments, the bias detection system 106 identifies the digital behavior log 202 by receiving the digital behavior log 202 from a computing device (e.g., a client device, an administrator device, or a third-party server). In some embodiments, the bias detection system 106 identifies the digital behavior log 202 by accessing a database storing digital behavior logs. For example, the bias detection system 106 can maintain a database and store digital behavior logs corresponding to users therein. In some instances, an external device or system stores digital behavior logs for access by the bias detection system 106.

As further shown in FIG. 2, the bias detection system 106 utilizes a machine learning model 204 to analyze the digital behavior log 202. In particular, as discussed below, the bias detection system 106 utilizes the machine learning model 204 to analyze a set of digital action sequences identified from the digital behavior log 202. The set of digital action sequences can correspond to a set of sessions for a task executed by the user.

In one or more embodiments, the machine learning model includes a neural network, such as an attention neural network. The architecture of an attention neural network utilized by the bias detection system 106 to analyze the digital behavior log 202 in one or more embodiments will be discussed below with reference to FIGS. 4A-4B. It should be noted, however, that the bias detection system 106 can utilize various other machine learning models (e.g., linear or logistic regression models, decision trees), including various other neural network architectures (e.g., various recurrent neural network architectures), to analyze the digital behavior log 202 (e.g., the digital action sequences from the digital behavior log 202) as needed.

Additionally, as shown in FIG. 2, the bias detection system 106 utilizes the machine learning model 204 to generate sessions weights 206 based on the analysis of the digital behavior log 202 (e.g., based on the analysis of the set of digital action sequences that correspond to the set of sessions for the task). In one or more embodiments, the session weights indicate an extent to which a future session for the task is predicted to be influenced by the set of sessions that were previously executed by the user. Indeed, the sessions weights can indicate an action-selection bias associated with a user's reliance on or favoritism toward previously-selected digital action sequences when selecting a sequence of digital actions for execution of the task. In one or more embodiments, the bias detection system 106 further extracts the session weights 206 from the machine learning model 204.

As described below, in one or more embodiments, the bias detection system 106 utilizes the machine learning model 204 to generate the session weights 206 based on an analysis of sets of digital action sequences corresponding to sets for sessions for the task executed by the user. For example, the bias detection system 106 can utilize the machine learning model 204 to analyze digital action sequences that correspond to all sessions (or a large number of sessions) for the task executed by the user rather than a set of sessions that covers only a portion of those sessions, which may include only relatively few of the sessions for the task executed by the user. Thus, in one or more embodiments, the session weights 206 do not correspond to particular sessions from the sets of sessions. Rather, the session weights 206 correspond to a generalized window that indicates, based on the values of the session weights, whether the corresponding user favors earlier sessions previously executed by the user or later sessions previously executed by the user.

In one or more embodiments, the bias detection system 106 further generates a visual indication of the action-selection bias of the user based on the session weights 206. For example, as shown in FIG. 2, the bias detection system 106 can generate a visual indication similar to one of the visual indications 208a-208c based on the values of the session weights 206. Though FIG. 2 illustrates the visual indications 208a-208c as graphs, the bias detection system 106 can generate various other forms of visual indications (e.g., frequency heat maps, notifications).

In one or more embodiments, an action-selection bias of a user includes a recency bias of the user. Accordingly, the bias detection system generates a visual indicator that represents this recency bias (e.g., the visual indicator 208a). In some embodiments, the action-selection bias of the user includes an anchoring bias. Accordingly, the bias detection system 106 generates a visual indicator that represents the anchoring bias (e.g., the visual indicator 208c). In some instances, however, the bias detection system 106 determines that the user is not associated with an action-selection bias and generates a visual indication (e.g., the visual indicator 208b) accordingly.

Figure 3:
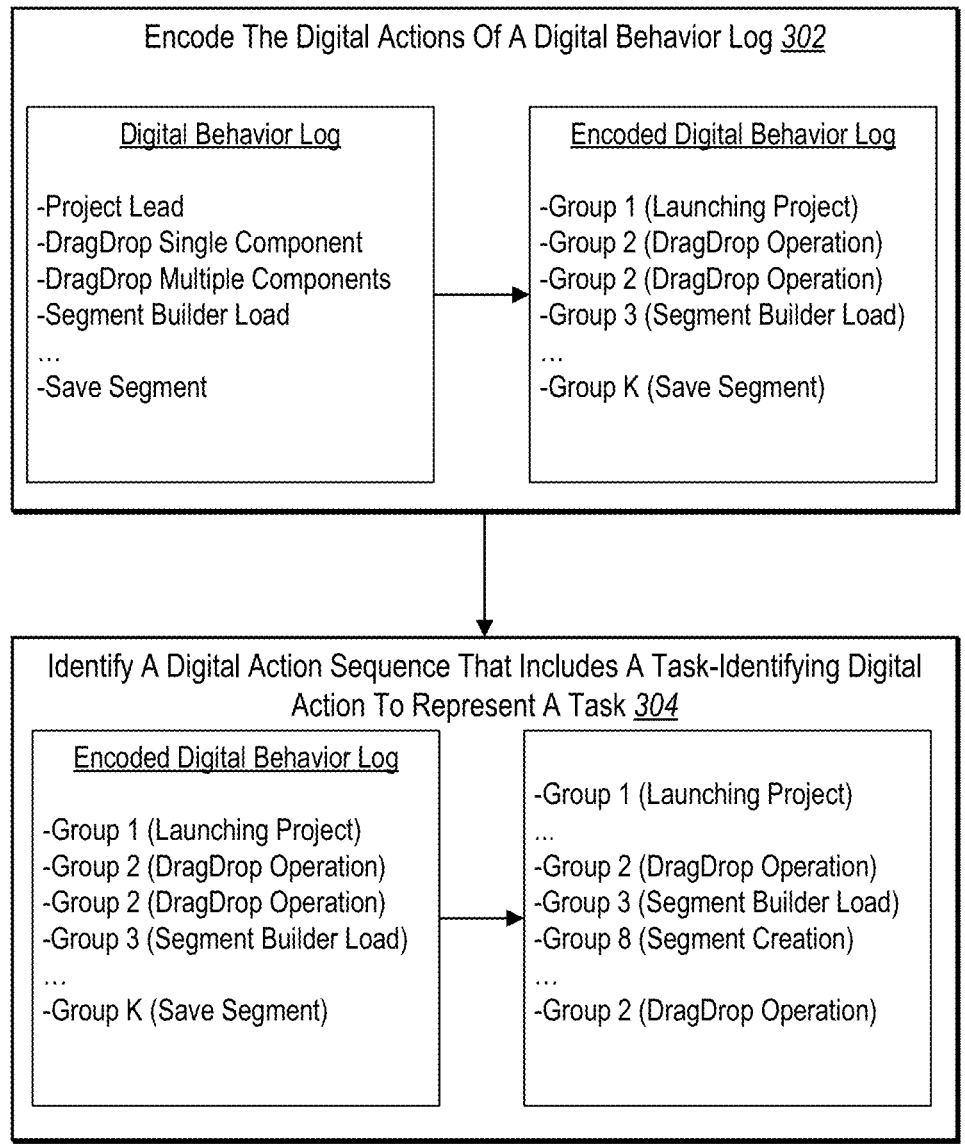
FIG. 3 illustrates an overview of the bias detection system identifying a set of digital action sequences from a digital behavior log in accordance with one or more embodiments.

As mentioned above, the bias detection system 106 utilizes a machine learning model to analyze a set of digital action sequences that have been identified from a digital behavior log of the user. Indeed, the set of digital action sequences can correspond to a set of sessions for a task executed by the user. FIG. 3 illustrates an overview of a sequence of steps that the bias detection system 106 performs for identifying a set of digital action sequences from a digital behavior log in accordance with one or more embodiments. Though FIG. 3 illustrates the bias detection system 106 performing the steps in a particular sequence, the bias detection system 106 can perform the steps in different sequence orders as well.

For instance, as shown in FIG. 3, the bias detection system 106 performs an act 302 of encoding the digital actions of a digital behavior log. In particular, the bias detection system 106 can encode the digital actions of the digital behavior log within a categorical action space. For example, the number of digital actions available for selection can be very high. Accordingly, the bias detection system 106 can establish a categorical action space that includes a number of action categories. The bias detection system 106 can determine the number of action categories based on a pre-determined number of action categories or based on input received from a user (e.g., input received from an administrator via an administrator device).

The bias detection system 106 can further encode the digital actions of the digital behavior log by assigning each digital action to one of the action categories within the categorical actions space. In one or more, the bias detection system 106 assigns a plurality of digital actions to the same action category (e.g., where those digital actions are related). In some instances, however, the bias detection system 106 can assign only one digital action to an action category (e.g., the action category includes a single digital action). In some embodiments, the bias detection system 106 encodes the digital actions of the digital behavior log using one-hot encoding. Thus, the bias detection system 106 can reduce the dimensionality and noise of the data to be analyzed by the machine learning model by grouping together related digital actions. In one or more embodiments, the bias detection system 106 generates an encoded digital behavior log for the user that includes the encodings of the digital actions from the digital behavior log corresponding to the user.

As shown in FIG. 3, the bias detection system 106 further performs an act 304 of identifying a digital action sequence that includes a task-identifying digital action to represent a task. For example, the bias detection system 106 can identify, from the encoded digital behavior log corresponding to the user, a task-identifying digital action (e.g., an encoded task-identifying digital action, such as "Group 3 (Segment Builder Load)") that corresponds to a desired task.

The bias detection system 106 can further select, from the encoded digital behavior log, a set of digital actions (e.g., encoded digital actions) from within a threshold number of digital actions of the task-identifying digital action. To illustrate, the bias detection system 106 can select a first subset of digital actions that chronologically precedes the task-identifying digital action and is within a threshold number of digital actions from the task-identifying digital action (e.g., the encoded digital actions "Group 1 (Launching Project) . . . Group 2 (Dragdrop Operation)"). Additionally, the bias detection system 106 can select a second subset of digital actions that chronologically follows the task-identifying digital action and is within the threshold number of digital actions from the task-identifying digital action (e.g., the encoded digital actions "Group 8 (Segmentation Creation) . . . Group 2 (Dragdrop Operation)"). The bias detection system 106 can determine the threshold number of digital actions based on a pre-determined threshold number of digital actions or based on input received from a user (e.g., input received from an administrator via an administrator device). In some embodiments, the bias detection system 106 establishes the threshold number of digital actions based on an average number of digital actions selected per session of a task or a frequency distribution indicating the numbers of digital actions selected per session for a task.

In one or more embodiments, the bias detection system 106 determines that the number of digital actions that chronologically follows and/or chronologically precedes the task-identifying digital action is less than the threshold number of digital actions. In response, the bias detection system 106 can pad the remainder of the digital action sequence with zeroes or null values. In some embodiments, the bias detection system 106 determines that another task-identifying digital action that corresponds to the task is within the threshold number of digital actions. In response, the bias detection system 106 can reduce the threshold number of digital actions selected around the (initial) task-identifying digital action. Thus, the bias detection system 106 selects or otherwise identifies a digital action sequence that corresponds to a session for a task executed by the user.

As mentioned above, the bias detection system 106 can perform the steps illustrated by FIG. 3 in different sequence orders. Accordingly, the bias detection system 106 can identify the digital action sequence and then encode the digital actions of the digital action sequence in some embodiments.

The bias detection system 106 can repeat the act 304 to identify a set of digital action sequences that correspond to a set of sessions for the task. For example, in one or more embodiments, the bias detection system 106 identifies all digital action sequences that correspond to a session for the task. In some embodiments, the bias detection system 106 identifies a pre-established number of digital action sequences that correspond to a session for the task.

Figure 4A:
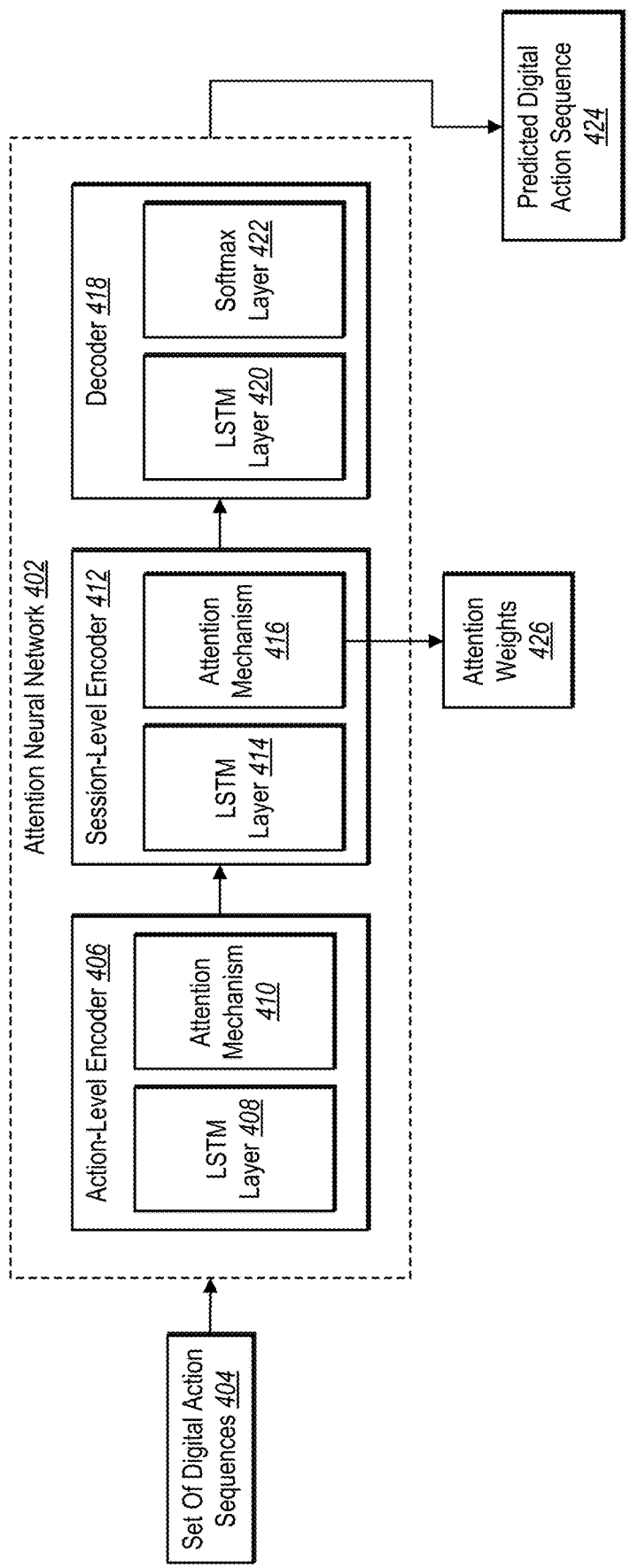
FIGS. 4A-4B illustrate diagrams of an attention neural network used to generate attention weights in accordance with one or more embodiments.
Figure 4B:
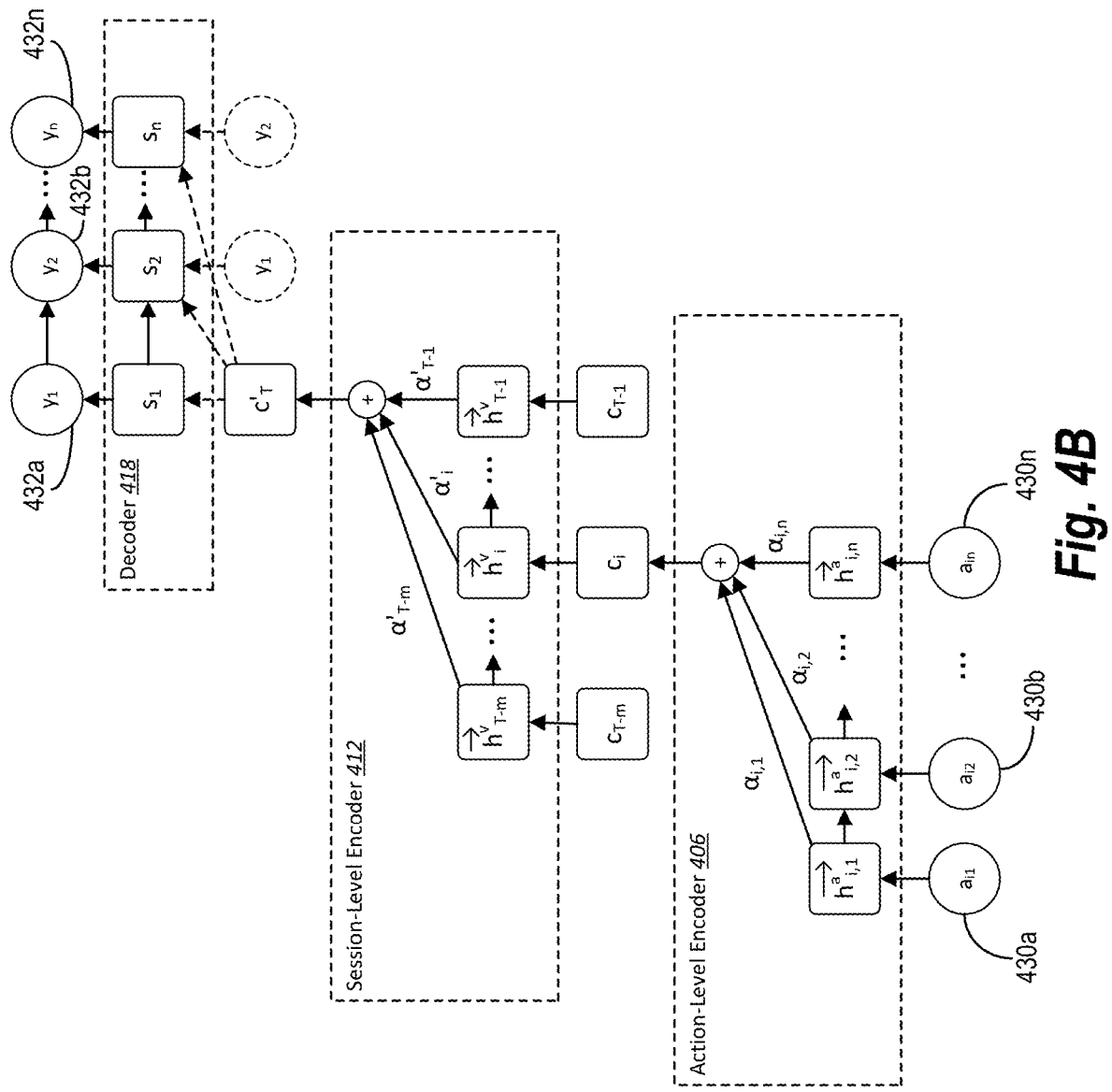

As mentioned above, the bias detection system 106 can utilize a machine learning model to generate session weights based on a set of digital action sequences identified from the digital behavior log of a user and correspond to a set of sessions for a task executed by the user. As further mentioned, in one or more embodiments, the machine learning model includes a neural network, such as an attention neural network. Accordingly, the session weights can include attention weights generated utilizing the attention neural network. In accordance with one or more embodiments, FIGS. 4A-4B illustrate diagrams of an attention neural network that can generate attention weights based on a set of digital action sequences corresponding to a user. In particular, FIG. 4A illustrates a block diagram providing a broad overview of the architecture of an attention neural network as well as the inputs and outputs of the attention neural network. FIG. 4B illustrates a diagram that provides more detail regarding the values generated by the various components of the attention neural network.

As shown in FIG. 4A, the bias detection system 106 provides a set of digital action sequences 404 to the attention neural network 402. The set of digital action sequences 404 can include a plurality of digital action sequences identified from a digital behavior log corresponding to a user, as discussed above with reference to FIG. 3. Further, the set of digital action sequences 404 can include digital action sequences that correspond sessions for the same task.

In one or more embodiments, the set of digital action sequences 404 does not include all digital action sequences from the digital behavior log of the user that correspond to sessions for the same task. Rather, the set of digital action sequences 404 can include a portion of the digital action sequences. The number of digital action sequences included in the set of digital action sequences 404 can vary. Indeed, the bias detection system 106 can determine the number of digital action sequences to include based on a pre-determined number of digital action sequences or based on input received from a user (e.g., input received from an administrator via an administrator device). In one or more embodiments, the bias detection system 106 includes one or more of the other digital action sequences from the digital behavior log that correspond to sessions for the task in other sets of digital action sequences (e.g., corresponding to rolling windows of sessions for the task) as will be discussed below with reference to FIG. 5.

Further, in one or more embodiments, the bias detection system 106 selects digital action sequences to include in the set of digital action sequences 404 based on a chronological order. Indeed, rather than including a random selection of digital action sequences from the digital behavior log of the user in the set of digital action sequences 404, the bias detection system 106 can include digital action sequences that chronologically precede and/or follow one another.

Though the set of digital action sequences 404 shown in FIG. 4A has been described as including digital action sequences that correspond to the same user, the bias detection system 106 can utilize sets of digital actions sequences that include digital action sequences that correspond to different users in one or more embodiments. Indeed, the bias detection system 106 can utilize such sets of digital actions to generate baseline attention weights as discussed below with reference to FIG. 5.

As shown in FIG. 4A, the bias detection system 106 utilizes the attention neural network 402 to analyze the set of digital action sequences 404. As shown in FIG. 4A, the attention neural network 402 includes an action-level encoder 406. The bias detection system 106 can utilize the action-level encoder 406 of the attention neural network 402 to perform an action-level analysis of the set of digital action sequences 404. For example, in one or more embodiments, the bias detection system 106 utilizes the action-level encoder 406 to analyze each digital action of a given digital action sequence. As illustrated in FIG. 4A, the action-level encoder 406 includes a long short-term memory ("LSTM") layer 408 and an attention mechanism 410.

As further shown in FIG. 4A, the attention neural network 402 includes a session-level encoder 412. The bias detection system 106 can utilize the session-level encoder 412 to perform a session-level analysis of the set of digital action sequences 404. For example, in one or more embodiments, the bias detection system 106 utilizes the session-level encoder 412 to analyze each digital action sequence from the set of digital action sequences 404 as a whole. In some instances, the session-level encoder 412 analyzes values generated by the action-level encoder 406. As illustrated in FIG. 4A, the session-level encoder 412 includes an LSTM layer 414 and an attention mechanism 416.

Additionally, as illustrated in FIG. 4A, the attention neural network 402 includes a decoder 418. The bias detection system 106 can utilize the decoder 418 to analyze values generated by the session-level encoder 412. Based on the analysis, the decoder 418 can generate a predicted digital action sequence 424. In one or more embodiments, the predicted digital action sequence 424 corresponds to a subsequent session for the task that chronologically follows the digital action sequences from the set of digital action sequences 404. Indeed, the attention neural network 402 can generate the predicted digital action sequence 424 as a prediction of the sequence of digital actions the user would select for a session for the task following the set of sessions for the task corresponding to the set of digital action sequences 404. As illustrated in FIG. 4A, the decoder 418 includes an LSTM layer 420 and a softmax layer 422.

As further shown in FIG. 4A, the bias detection system 106 utilizes the attention neural network 402 to generate the attention weights 426 based on the analysis of the set of digital action sequences 404. In particular, as shown, the bias detection system 106 utilizes the attention mechanism 416 of the session-level encoder 412 to generate the attention weights 426. The bias detection system 106 can further extract the attention weights 426 from the attention neural network 402 (e.g., from the attention mechanism 416 of the session-level encoder 412). In one or more embodiments, the attention weights 426 indicate an extent to which the subsequent session for the task is predicted to be influenced by the sessions corresponding to the set of digital action sequences 404. The bias detection system 106 can utilize the attention weights 426 to generate a visual indication of an action-selection bias of the user.

FIG. 4B illustrates a diagram providing additional detail regarding values generated by the various components of the attention neural network 402 in accordance with one or more embodiments. In particular, FIG. 4B illustrates the bias detection system 106 utilizing the attention neural network 402 to analyze a single set of digital action sequences corresponding to a single set of sessions for a task to generate a predicted digital action sequence that corresponds to a subsequent session for the task.

For example, in one or more embodiments, the bias detection system 106 utilizes the attention neural network 402 to determine (e.g., predict) a digital action sequence corresponding to a session for task k at time T. To do so, the bias detection system 106 provides a set of digital action sequences that correspond to m sessions for the task k as input to the attention neural network 402. In particular, the m sessions correspond to sessions for task k performed sequentially in time $T-m, T-m+1, \ldots, T-1$. In one or more embodiments, each of the digital action sequences corresponding to the m sessions can include n digital actions.

Likewise, the digital action sequence corresponding to the session for task k at time T can also include n digital actions.

To illustrate, as shown in FIG. 4B, the bias detection system 106 provides, as input to the attention neural network 402, a digital action sequence corresponding to an i-th session for task k. The digital action sequence includes the digital actions 430*a*-430*n* (e.g., encodings of the digital actions 430*a*-430*n*). The bias detection system 106 utilizes the LSTM layer 408 of the action-level encoder 406 to analyze an input $a_{i,t}$ and the previous hidden state $h_{i,t-1}^a$ to calculate the hidden state $h_{i,t}^a$ for the i-th session at time step t as follows:

$$h_{i,t}^a = \tan h(W_{hh} h_{i,t-1}^a + W_{ah} a_{i,t}) \quad (1)$$

In function (1), $h_{i,t}^a \in R^n$ and $W_{hh}$ and $W_{ah}$ represent weight matrices that the attention neural network 402 learns during analysis of the globalized digital action sequences and/or the personalized digital action sequences (as discussed below with reference to FIG. 5). In function (1), the superscript a indicates that the corresponding hidden state is an action-level hidden state generated by the action-level encoder 406.

After generating the hidden states for all digital actions of the i-th session, the bias detection system 106 can utilize the attention mechanism 410 of the action-level encoder 406 to generate the action-level context vector $c_i$ for the i-th input into the session-level encoder 412 (e.g., the input corresponding to the i-th session). For example, the bias detection system 106 can utilize the attention mechanism 410 of the action-level encoder 406 to generate the action-level context vector $c_i$ as a weighted average of the hidden states for the i-th session $h_{i,j}^a$ as follows:

$$c_i = \sum_{j=1}^{n} \alpha_{i,j} \vec{h}_{i,j}^a \quad (2)$$

In function (2), $\alpha_{i,j}$ represents the attention weight corresponding to the i-th session and the hidden state corresponding to the j-th digital action generated by the action-level encoder 406. In particular, $\alpha_{i,j}$ is an attention weight from the attention mechanism 410 of the action-level encoder and represents the significance of the j-th digital action in the action-level context vector corresponding to the i-th session. In one or more embodiments, the bias detection system 106 determines the attention weight $\alpha_{i,j}$ as follows:

$$\alpha_{i,j} = \frac{\exp(e_{i,j})}{\sum_{k=1}^{n} \exp(e_{i,k})} \quad (3)$$

In function (3), $e_{i,j}$ represents an alignment score between the i-th input into the session-level encoder 412 (e.g., the input corresponding to the i-th session) and the j-th hidden state generated by the action-level encoder 406. In one or more embodiments, $e_{i,j}=a(h_{i-1}^v, h_j^a)$. In particular, the superscript v indicates that the corresponding hidden state is a session-level hidden state generated by the session-level encoder 412 and a( ) represents an alignment model. In one or more embodiments, the bias detection system 106 trains the alignment model while analyzing the globalized digital action sequences and/or the personalized digital action sequences (as discussed below with reference to FIG. 5). In particular, the bias detection system 106 can train the alignment model via back-propagation of gradient from the decoder level.

In one or more embodiments, the bias detection system 106 utilizes the action-level encoder 406 to generate a plurality of action-level context vectors (e.g., action-level context vectors $c_{T-m}$ through $c_{T-1}$) corresponding to the set of sessions using functions (1)-(3). In one or more embodiments, the bias detection system 106 utilizes the LSTM layer 414 of the session-level encoder 412 to analyze the plurality of action-level context vectors and generate corresponding hidden states as follows:

$$h_i^v = \tan h(W_{hh} h_{i-1}^v + W_{vh} c_i) \quad (4)$$

In function (4), $h_i^v \in R^n$ and represents the i-th hidden state generated by the session-level encoder 412. Further, $W_{hh}$ and $W_{vh}$ represent weight matrices that the attention neural network 402 learns during analysis of the globalized digital action sequences and/or the personalized digital action sequences (as discussed below with reference to FIG. 5).

After generating the hidden states for all action-level context vectors, the bias detection system 106 can utilize the attention mechanism 416 of the session-level encoder 412 to generate the session-level context vector $c'_T$ for visit T as follows:

$$c'_T = \sum_{i=T-m}^{T-1} \alpha'_i \vec{h}_i^v \quad (5)$$

In function (5), $\alpha'_i$ represents an attention weight from the attention mechanism 416 of the session-level encoder 412. In one or more embodiments, the bias detection system 106 determines the attention weight $\alpha'_i$ as follows:

$$\alpha'_i = \frac{\exp(e'_{pi})}{\sum_{l=T-m}^{T-1} \exp(e'_{pl})} \quad (6)$$

In function (6), $e'_{pi}$ represents an alignment score between the i-th session and the p-th predicted digital action (e.g., generated by the decoder 418). In one or more embodiments, $e'_{pi}=a'(s_{p-1}, h_i^v)$. In particular, a'( ) represents an alignment model. In one or more embodiments, the bias detection system 106 trains the alignment model while analyzing the globalized digital action sequences and/or the personalized digital action sequences (as discussed below with reference to FIG. 5).

In one or more embodiments, the bias detection system 106 utilizes the decoder 418 of the attention neural network 402 to generate a predicted digital action sequence corresponding to a session for task k at time T based on the session-level context vector $c'_T$. In particular, in one or more embodiments, the bias detection system 106 utilizes the LSTM layer 420 of the decoder 418 to generate hidden states based on the session-level context vector $c'_T$ as follows:

$$s_i = f(c'_T, s_{i-1}, y_{i-1}) \quad (7)$$

In function (7), $s_i$ represents the hidden state corresponding to the i-th session, $s_{i-1}$ represents the previous hidden state, and $y_{i-1}$ represents the previous predicted digital action (e.g., the digital action that precedes the predicted digital action $y_i$ within the predicted digital action sequence). In one or more embodiments, the function $f(\ )$ is a learned function.

Indeed, the bias detection system 106 can learn the function f( ) while analyzing the globalized digital action sequences and/or the personalized digital action sequences (as discussed below with reference to FIG. 5).

In one or more embodiments, the bias detection system 106 further utilizes the softmax layer 422 of the decoder 418 to generate the predicted digital action $y_i$ based on the hidden state $s_i$ as follows:

$$y_i = \text{softmax}(s_i) \qquad (8)$$

Thus, the bias detection system 106 can utilize the attention neural network 402 to generate a predicted digital action sequence that includes the predicted digital actions 432a-432n. Indeed, as mentioned above, the predicted digital action sequence corresponds to a session for task k that follows the set of sessions for task k analyzed by the attention neural network 402. In one or more embodiments, the bias detection system 106 generates a given predicted digital action (e.g., one of the predicted digital actions 432a-432n) by generating a probability vector over the action categories discussed above with reference to FIG. 3.

Figure 5A:
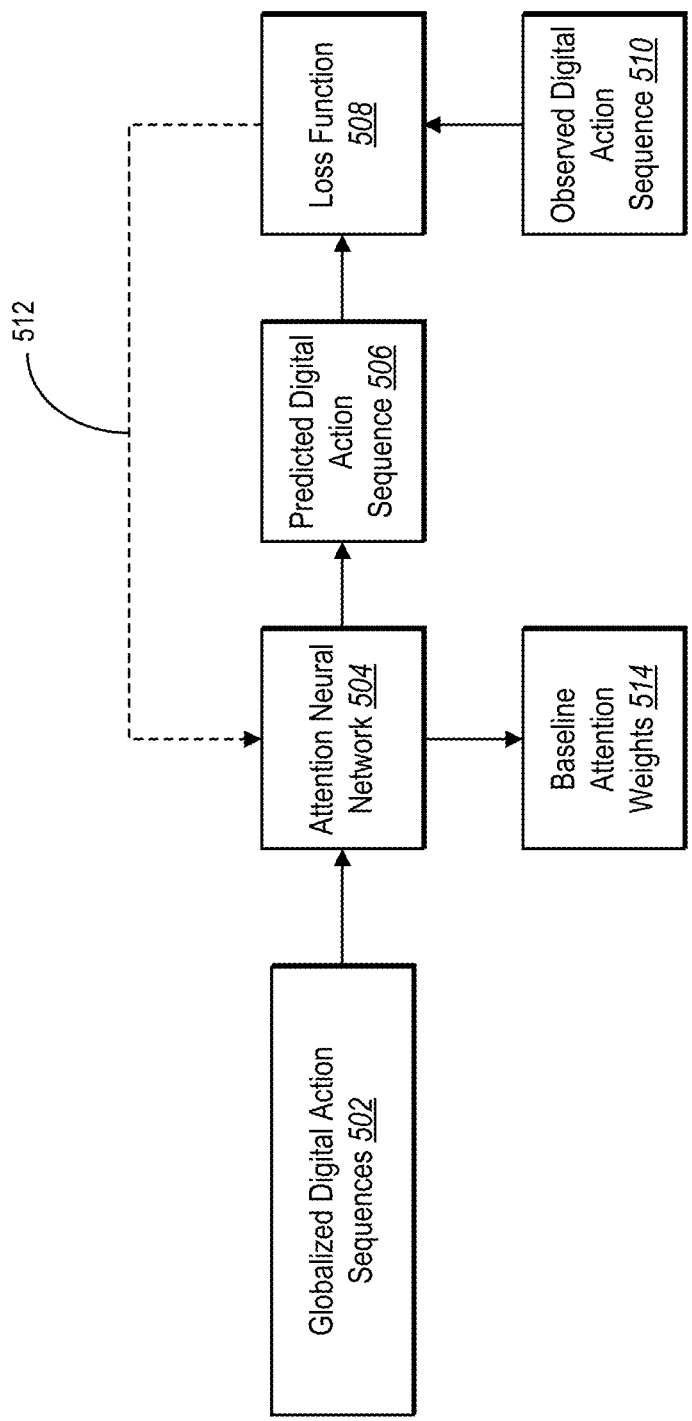
FIGS. 5A-5B illustrate block diagrams for a multi-phase process for generating attention weights that correspond to a user in accordance with one or more embodiments.
Figure 5B:
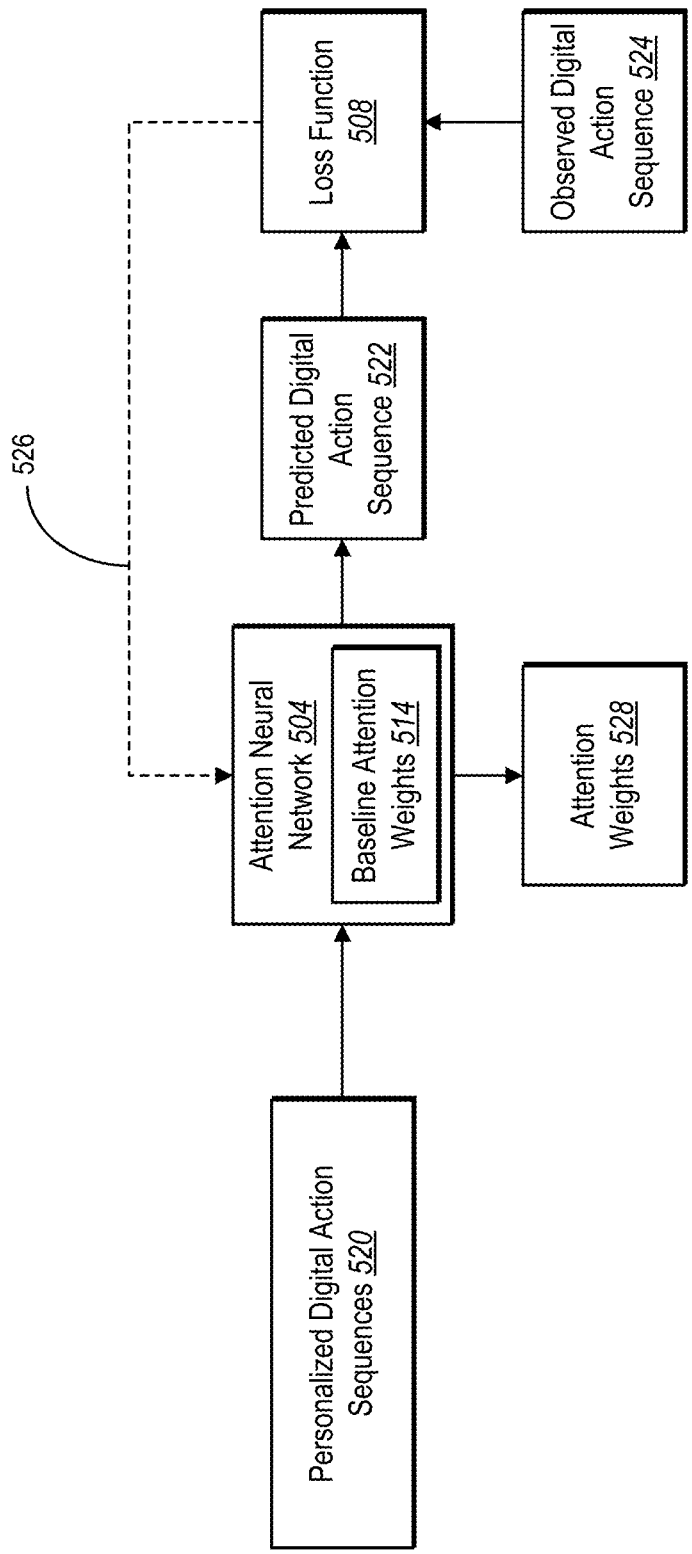

In one or more embodiments, the bias detection system 106 utilizes an attention neural network to generate the attention weights that correspond to an action-selection bias of a user using a multi-phase process. For example, the bias detection system 106 can utilize the attention neural network to generate a plurality of baseline attention weights by analyzing globalized digital action sequences in a first phase. The bias detection system 106 can further utilize the attention neural network to adjust the baseline attention weights to generate attention weights that correspond more particularly to a user by analyzing personalized digital action sequences in a second phase. FIGS. 5A-5B illustrate block diagrams for utilizing a multi-phase process for generating attention weights that correspond to an action-selection bias of a user in accordance with one or more embodiments. In particular, FIG. 5A illustrates a block diagram for generating baseline attention weights based on globalized digital action sequences. FIG. 5B illustrates a block diagram for generating attention weights that correspond more particularly to a user based on personalized digital action sequences.

As shown in FIG. 5A, the bias detection system 106 provides globalized digital action sequences 502 to the attention neural network 504. In one or more embodiments, the globalized digital action sequences 502 include digital action sequences that correspond to sessions for a task executed by a plurality of users. For example, in one or more embodiments, the globalized digital action sequences 502 includes a three-dimensional matrix with dimensions n×m×p, where n represents the total number of analysts with at least a threshold number of sessions for the task, m represents the maximum number of sessions for the task performed by the n analysts, and p includes the size of the digital action sequences considered (e.g., the number of digital actions in the digital action sequences).

In some instances, the bias detection system 106 generates sets of globalized digital action sequences from the globalized digital action sequences 502 where each set of globalized digital action sequences corresponds to a particular user and a given pair of sets of globalized digital action sequences can correspond to multiple users. In one or more embodiments, a set of globalized digital action sequences that corresponds to a user can include digital action sequences corresponding to a sequence of sessions for the task as discussed above with reference to FIGS. 4A-4B. In some embodiments, however, each set of globalized digital action sequences can include digital action sequences from a plurality of users.

As further shown in FIG. 5A, the bias detection system 106 utilizes the attention neural network 504 to generate a predicted digital action sequence 506. Indeed, the bias detection system 106 can utilize the attention neural network 504 to generate the predicted digital action sequence 506 as discussed above with reference to FIGS. 4A-4B. For example, the bias detection system 106 can utilize the attention neural network 504 to analyze a set of globalized digital action sequences from the globalized digital action sequences 502 and generate the predicted digital action sequence 506 based on the analysis. In one or more embodiments, the predicted digital action sequence 506 corresponds to a session for the task executed by the user that follows the set of sessions for the task corresponding to the set of globalized digital action sequences.

Additionally, as shown in FIG. 5A, the bias detection system 106 compares the predicted digital action sequence 506 with an observed digital action sequence 510 using a loss function 508. In one or more embodiments, the observed digital action sequence 510 corresponds to the session for the task executed by the user that follows the set of sessions for the task corresponding to the set of globalized digital action sequences. In other words, the set of globalized digital action sequences and the predicted digital action sequence 506 can correspond to sessions for the task executed by the same user (e.g., identified from the digital behavior log associated with the same user).

In one or more embodiments, the loss function 508 includes a cross-entropy loss function, though the loss function 508 can include various other applicable losses. As mentioned above, a given predicted digital action can include a probability vector that includes a plurality of probabilities over the available action categories. Accordingly, in one or more embodiments, the bias detection system 106 takes the cross-entropy loss for all of the probabilities within the probability vector.

As shown in FIG. 5A, the bias detection system 106 back propagates the determined loss to the attention neural network 504 (as indicated by the dashed line 512) to optimize the model by updating its parameters/weights. For example, in one or more embodiments, the bias detection system 106 averages the cross-entropy loss function across the globalized digital action sequences 502 and back propagates the determined average to update the weights of the LSTM layers and attention mechanisms of the attention neural network 504. Consequently, with each iteration of training, the bias detection system 106 gradually improves the accuracy (e.g., minimizes the loss) with which the attention neural network 504 can predict the digital action sequence $\{\{y_i\}_{i=1}^n\}_T$ from the sequence of sessions $V_{T-m}$ to $V_{T-1}$. Accordingly, the bias detection system 106 can utilize the attention neural network 504 to generate the baseline attention weights 514 based on the globalized digital action sequences 502.

As shown in FIG. 5B, the bias detection system 106 provides personalized digital action sequences 520 to the attention neural network 504. In particular, the personalized digital action sequences 520 can include digital action sequences that correspond to sessions for the task executed by the same user. In some instances, the bias detection system 106 generates sets of personalized digital action sequences from the personalized digital action sequences

520. In one or more embodiments, the sets of personalized digital action sequences include rolling windows of sessions for the task.

As shown in FIG. 5B, the bias detection system 106 utilizes the attention neural network 504 to analyze a given set of personalized digital action sequences and generate a predicted digital action sequence 522. In particular, as shown, the attention neural network 504 analyzes the given set of personalized digital action sequences using the baseline attention weights 514 generated as discussed above with reference to FIG. 5A. In other words, the attention neural network 504 begins to analyze the personalized digital action sequences 520 using the baseline attention weights 514—before the bias detection system 106 updates the baseline attention weights 514. In one or more embodiments, the predicted digital action sequence 522 corresponds to a subsequent session for the task (e.g., a session for the task that chronologically follows the sessions for the task represented in the set of personalized digital action sequences).

Additionally, as shown in FIG. 5B, the bias detection system 106 compares the predicted digital action sequence 522 with an observed digital action sequence 524 using the loss function 508. In one or more embodiments, the observed digital action sequence 524 corresponds to the session for the task executed by the user that follows the set of sessions for the task corresponding to the set of personalized digital action sequences. Further, the bias detection system 106 back propagates the determined loss to the attention neural network 504 (as indicated by the dashed line 526) to optimize the model by updating its parameters/weights. For example, in one or more embodiments, the bias detection system 106 averages the cross-entropy loss function across the personalized digital action sequences 520 and back propagates the determined average to update the weights of the LSTM layers and attention mechanisms of the attention neural network 504. Consequently, with each iteration of training, the bias detection system 106 gradually improves the accuracy with which the attention neural network 504 can predict digital action sequences.

Accordingly, the bias detection system 106 can utilize the attention neural network 504 to generate the attention weights 528 that correspond more particularly to a given user based on rolling windows of sessions corresponding to the personalized digital action sequences 520. The attention weights 528 further correspond to and indicate an action-selection bias of the user. Indeed, the attention weights can indicate, where the user has previously executed a task multiple times in the past, whether the user will rely more on the older sessions or the more recent sessions when selecting a digital action sequence to execute the task in a future session.

To give an example of generating the attention weights based on a rolling windows of sessions, the personalized digital action sequences 520 can include ten digital action sequences corresponding to ten sessions for the task executed by the user. The bias detection system 106 can generate a first window of sessions (e.g., a first set of sessions) that includes sessions one through six (e.g., using a window size of six). The bias detection system 106 can further generate a second window of sessions that includes sessions two through seven, a third window of sessions that includes sessions three through eight, and a fourth window of sessions that includes sessions four through nine. The bias detection system 106 can utilize the attention neural network 504 to analyze the first window of sessions and generate a predicted digital action sequence that corresponds to the session seven (e.g., the bias detection system 106 predicts what digital action sequence would be included in the session seven). The bias detection system 106 further uses a loss function to compare the predicted digital action sequence to an observed digital action sequence that corresponds to session seven (e.g., the bias detection system 106 compares the predicted digital action sequence to session seven). The bias detection system 106 back propagates the determined loss to the attention neural network 504 to adjust or update its weights. The bias detection system 106 can reiterate the process using the second, third, and fourth windows of sessions, and thus utilize rolling windows of sessions to generate the attention weights 528 corresponding to the user.

The bias detection system 106 can utilize various other methods of generating session weights. For example, the bias detection system 106 can (e.g., utilizing the machine learning model 204 or, more specifically, the attention neural network 504) generate session weights based on the frequencies of digital actions associated with the digital action sequences. In particular, the bias detection system 106 can generate a predicted digital action sequence based on the frequency of digital actions associated with one or more previous sessions of a task. The bias detection system 106 can further update session weights based on comparing the predicted digital action sequence with a corresponding ground truth. Accordingly, the session weights can indicate an extent that a future session for the task relies on digital actions selected in previous sessions based on the frequencies of the digital actions selected in those previous sessions.

In one or more embodiments, the bias detection system 106 can apply the action-selection bias determined by analyzing sessions for one task to another task. In other words, the bias detection system 106 can determine that the action-selection bias indicated by the session weights generated for a user is more generally indicative of an action-selection bias that affects how that user selects digital action sequences for a variety of tasks.

Thus, the bias detection system 106 can utilize a machine learning model to generate sessions weights that correspond to an action-selection bias of a user. Accordingly, the algorithm and acts described with reference to FIG. 5B can comprise the corresponding structure for performing a step for determining session weights for the sessions utilizing a machine learning model. Additionally, the attention neural network architecture described with reference to FIGS. 4A-4B can comprise the machine learning model in a step for determining session weights for the sessions utilizing a machine learning model.

Figure 6A:
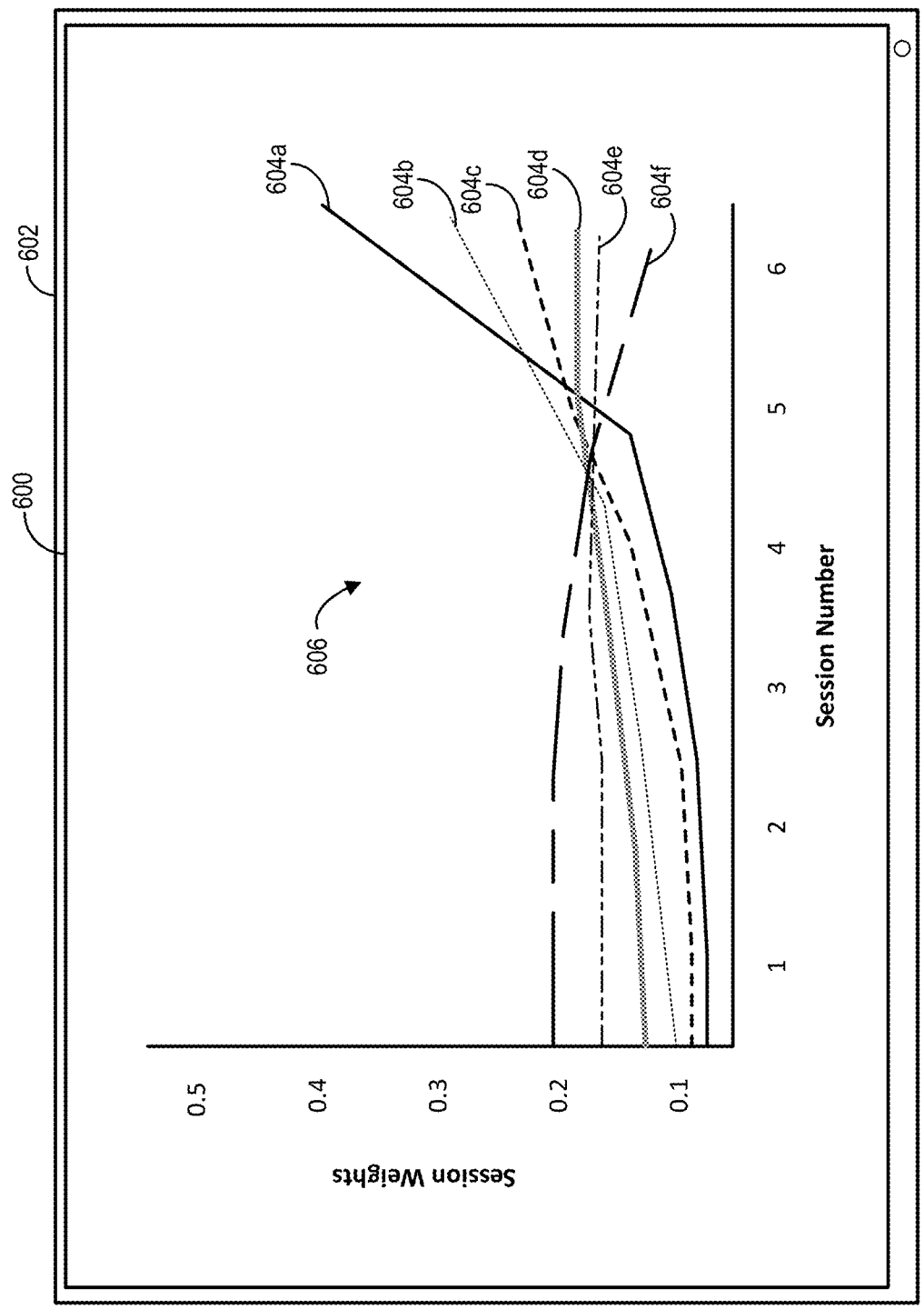
FIG. 6A illustrates a graphical user interface used by the bias detection system to display graphical representations of sets of session weights corresponding to a set of users in accordance with one or more embodiments.
Figure 6B:
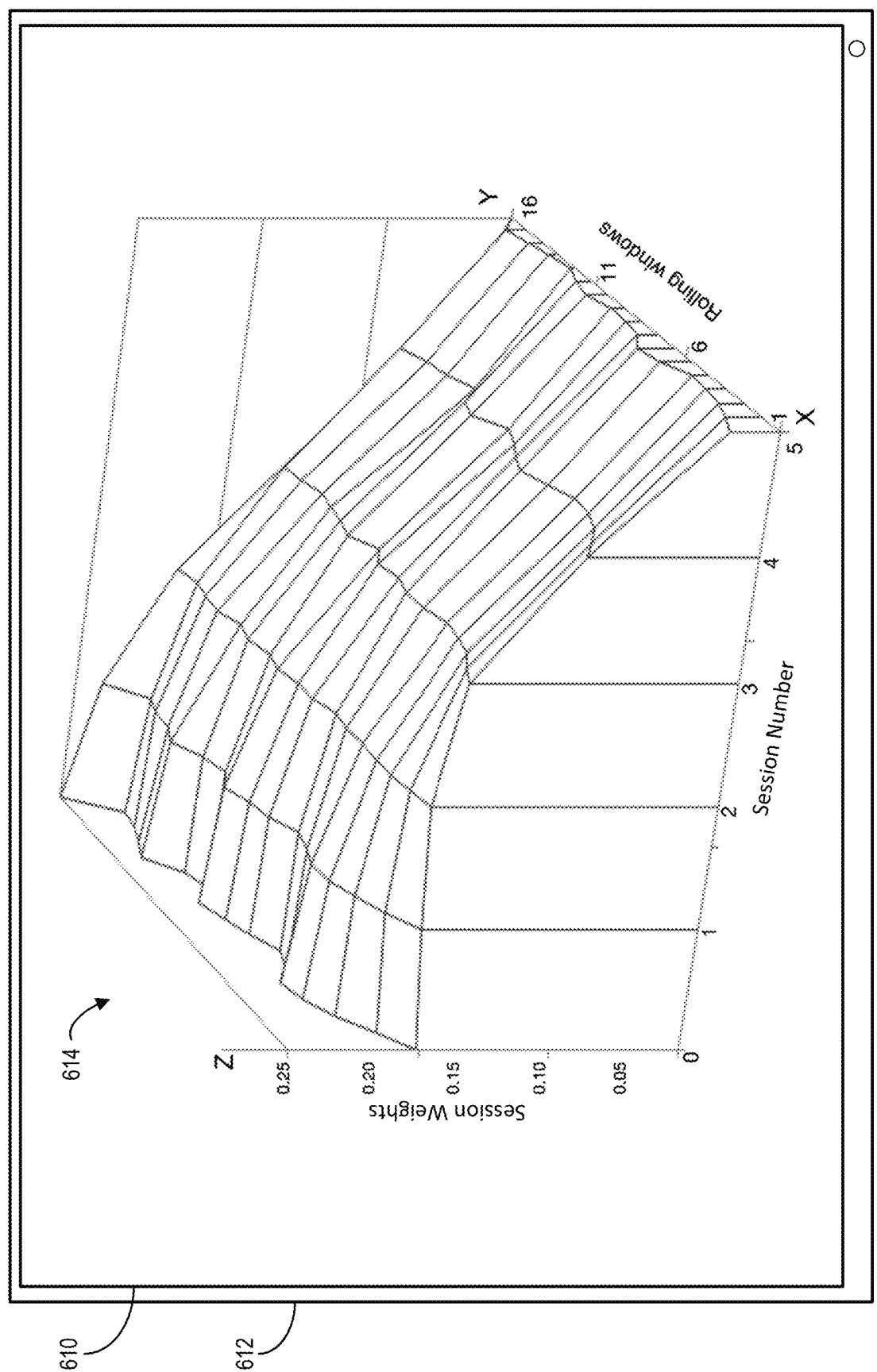
FIG. 6B illustrates a graphical user interface used by the bias detection system to display a graphical representation of session weights corresponding to a user in accordance with one or more embodiments.

As mentioned above, the bias detection system 106 can generate a visual indicator of an action-selection bias of a user. The bias detection system 106 can generate various different visual indicators. The bias detection system 106 can further provide the visual indicator for display on a graphical user interface. FIGS. 6A-7 illustrate graphical user interfaces used by the bias detection system 106 to display a visual indicator of an action-selection bias of a user in accordance with one or more embodiments.

In one or more embodiments, the bias detection system 106 provides, for display on a graphical user interface, visual indications of action-selection biases that correspond to a plurality of users. For example, FIG. 6A illustrates a graphical user interface 600 used by the bias detection system 106 to display graphical representations 604a-604f of sets of session weights corresponding to a set of users on a client device 602 in accordance with one or more embodiments. As shown in FIG. 6A, the bias detection system 106 presents the graphical representations 604a-604f in a graph 606 displayed within the graphical user interface 600. Indeed, each of the graphical representations 604-604f depicts "session weights" for a range of "session numbers." In one or more embodiments, the range of "session numbers" corresponds to the window size used by the bias detection system 106 to analyze the rolling windows of sessions utilizing the machine learning model to generate the sessions weights. For example, as shown in FIG. 6A, the graphical representations 604a-604f provide sessions weights across six different session numbers.

In one or more embodiments, the graphical representations 604a-604f directly correspond to the session weights generated by the machine learning model after analyzing the globalized digital action sequences and the personalized digital action sequences that correspond to the user. In other words, the graphical representations 604a-604f represent the user-specific session weights that were generated on top of the baseline session weights. In some instances, however, the bias detection system 106 determines the difference between the user-specific session weights for each corresponding user and the baseline session weights and generates the graphical representations 604a-604f based on the determined differences.

To provide examples of action-selection bias representation, the graphical representation 604a indicates a recency bias of the corresponding user. Indeed, as shown in FIG. 6A, the session weights of the graphical representation 604a increase across the session numbers, indicating that the corresponding user selects digital actions that align with the digital action sequences selected for more recent sessions. On the other hand, the graphical representation 604f indicates an anchoring bias of the corresponding user. As shown, the session weights of the graphical representation 604f decrease across the session numbers, indicating that the corresponding user selects digital actions that align with the digital action sequences selected for earlier sessions. In one or more embodiments, the graphical representation 604e indicates that the corresponding user does not have an action-selection bias, as the session weights vary only slightly across the session numbers. In some embodiments, however, the graphical representation 604e is indicative of strong anchoring bias, showing that the corresponding user has a long-running habit of selecting digital actions in accordance with early sessions.

In some embodiments, the bias detection system 106 provides, for display on a graphical user interface, a visual indication of an action-selection bias that corresponds to a single user. In some instances, the bias detection system 106 provides a visual indication corresponding to a single user in response to receiving a user interaction with one of the graphical representations 604a-604f presented within the graphical user interface 600. To illustrate, in response to receiving a user interaction with a graphical representation that corresponds to a particular user, the bias detection system 106 can provide, for display, one or more additional visual indications of the action-selection bias of that user (e.g., without the visual indications of the other users). In some embodiments, however, the bias detection system 106 provides the visual indication(s) of the action-selection bias of the user automatically and initially (e.g., without first providing a visual indication as part of the graphical representations 604a-604f).

The bias detection system 106 can generate and provide various visual indications of an action-selection bias of a single user. For example, FIG. 6B illustrates a graphical user interface 610 used by the bias detection system 106 to display a graphical representation 614 of session weights corresponding to a user on a client device 612 in accordance with one or more embodiments. In particular, the bias detection system 106 can generate the graphical representation 614 to represent changes to the attention weights across a set of rolling windows of sessions for the task that correspond to the user. Indeed, the bias detection system 106 can maintain the sessions weights for the user that resulted from analyzing each set of personalized digital action sequences (e.g., each window) for the user. Thus, the graphical representation 614 presents a three-dimensional graph that shows how the "session weights" for the "session numbers" changed across the various "rolling windows."

In one or more embodiments, the bias detection system 106 provides the graphical representation 614 for display as part of an animation. Indeed, the bias detection system 106 can provide an animation for display within the graphical user interface 610 that initially shows the session weights for the sessions numbers determined after analyzing the first window and then progressively adds the session weights determined after analyzing the subsequent windows.

Figure 6C:
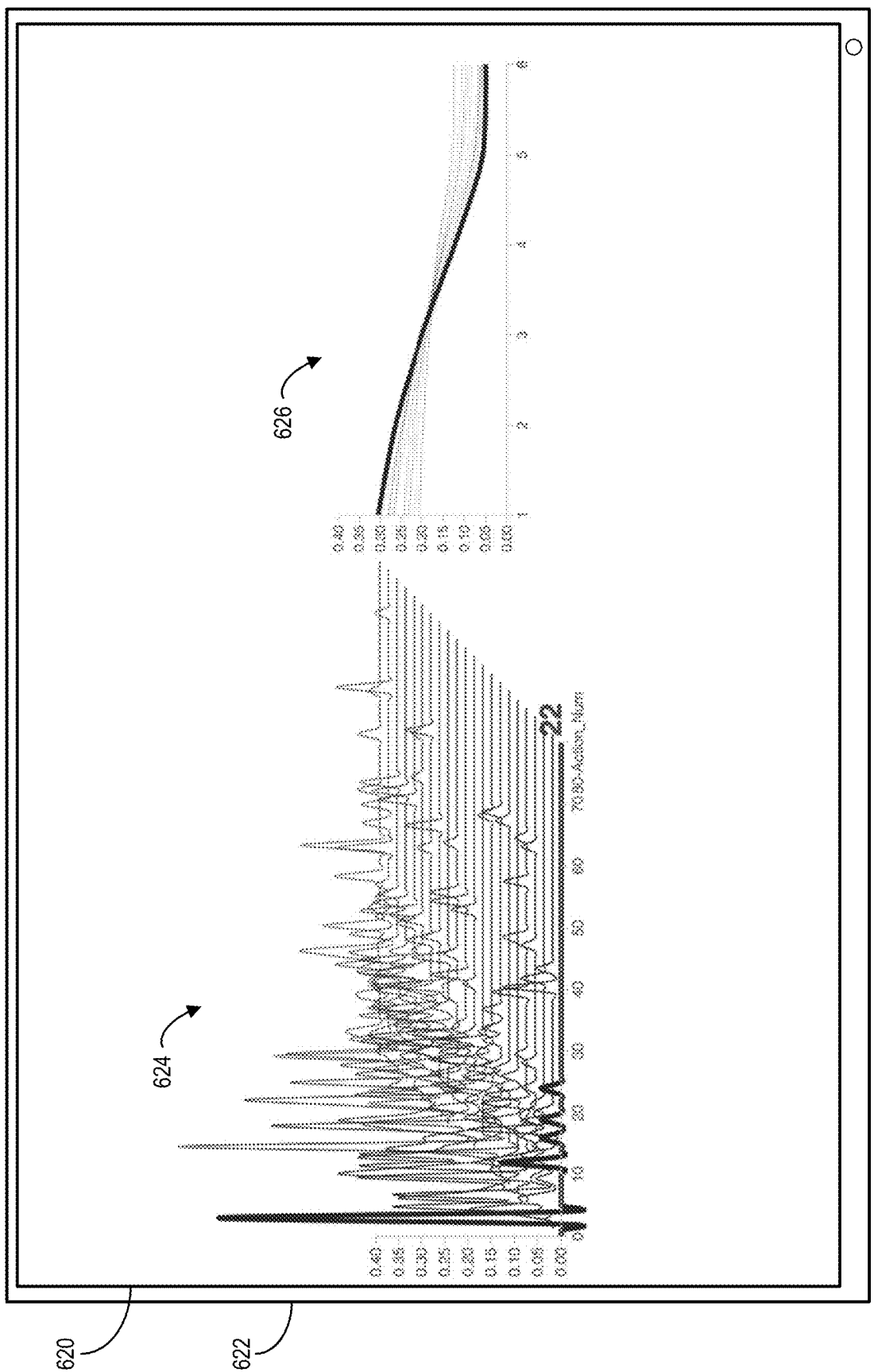
FIG. 6C illustrates a graphical user interface used by the bias detection system to display a graphical representation of frequencies of digital actions selected by the user in accordance with one or more embodiments.
Figure 7:
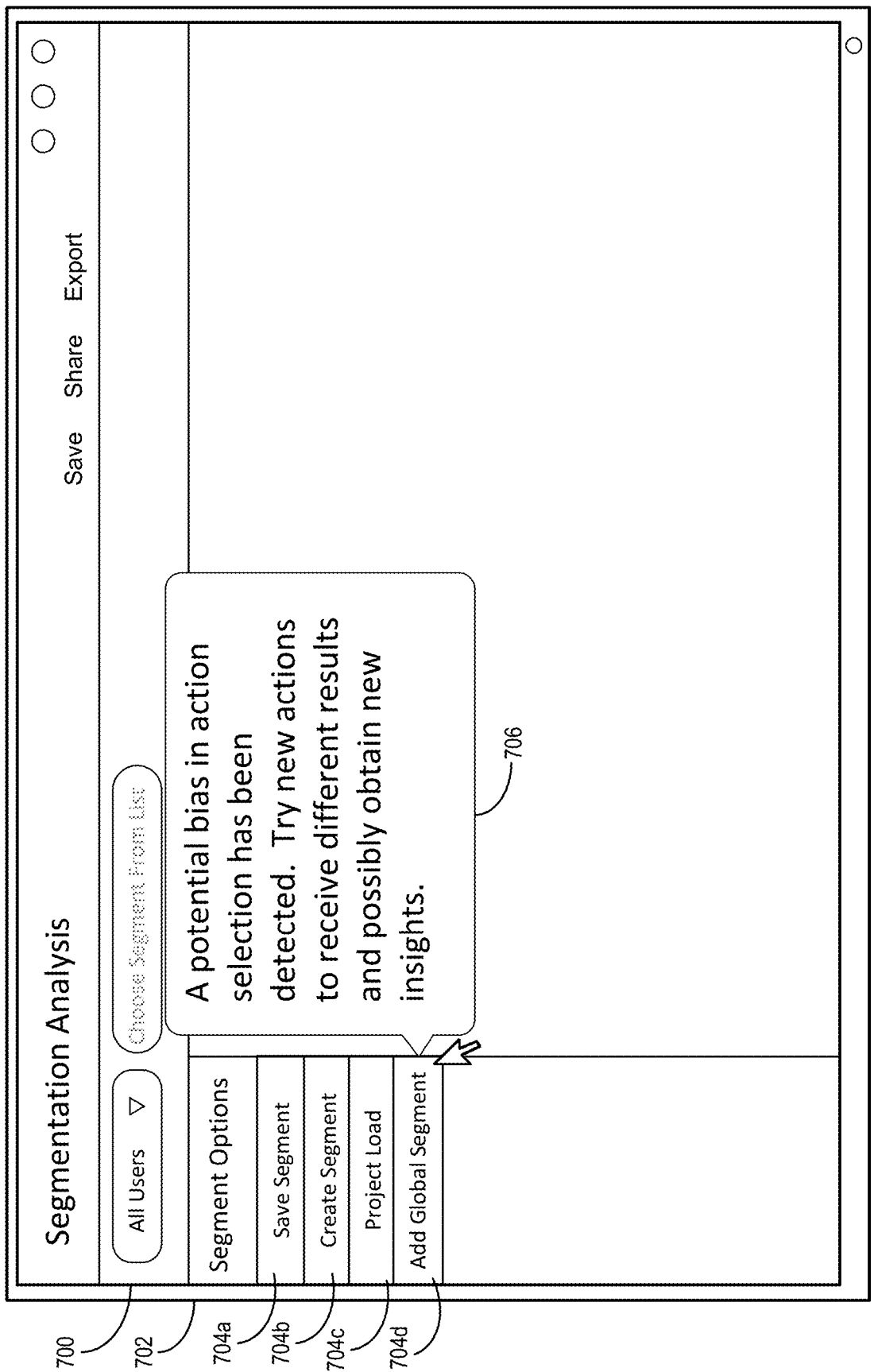
FIG. 7 illustrates a graphical user interface used by the bias detection system to display a visual indication of an action-selection bias of a user based on the user selecting digital actions consistent with the action-selection bias in accordance with one or more embodiments.

FIG. 6C illustrates another graphical user interface 620 used by the bias detection system 106 to display a graphical representation 624 of frequencies of digital actions selected by the user across the sessions for the task on a client device 622 in accordance with one or more embodiments. For example, as shown in FIG. 6C, the graphical representation 624 shows a plurality of frequency lines where each frequency line corresponds to a session for the task—with twenty-two sessions being represented in the graphical representation. Each frequency line shows, for a plurality of available digital actions, the frequency of digital actions selected for the corresponding session for the task. In some embodiments, rather than showing frequencies, the bias detection system 106 generates the graphical representation 624 to show a total number of times a given digital action was selected in a given session for the task.

As further shown in FIG. 6A, the bias detection system 106 can provide for display, in association with the graphical representation 624, a graphical representation 626. In particular, the graphical representation 626 can include graphical representations of the session weights determined after each session for the task represented in the graphical representation 624, including a graphical representation of the session weights determined after the final session for the task executed by the user (e.g., represented by the bold line). As shown, the graphical representation 624 indicates an anchoring bias of the corresponding user as the session weights decrease across the represented session numbers.

In one or more embodiments, the bias detection system 106 provides the graphical representations 624, 626 for display as part of an animation. Indeed, the bias detection system 106 can provide an animation for display within the graphical user interface 620 that initially shows (e.g., within the graphical representation 624) the frequencies of digital actions selected during the first session for the task and shows (e.g., within the graphical representation 626) the session weights determined after analyzing the first session for the task (or a window that includes the first session for the task). The bias detection system 106 can animate the graphical representations 624, 626 to progressively add, respectively, the frequencies of digital actions for each subsequent session and the adjusted session weights after analyzing the subsequent session.

Figure 6D:
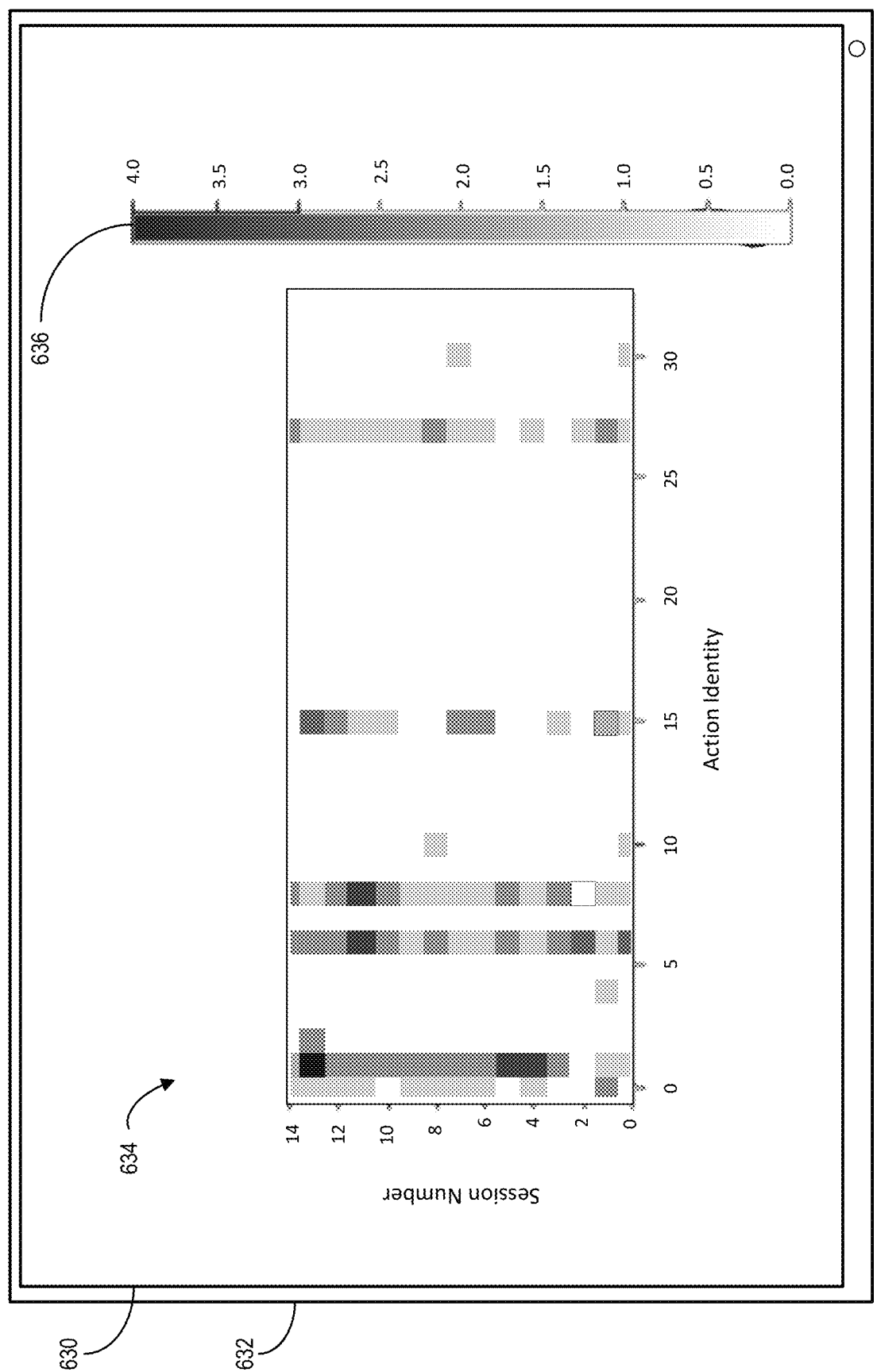
FIG. 6D illustrates a graphical user interface used by the bias detection system to display a frequency heat map indicating frequencies of digital actions selected by the user in accordance with one or more embodiments.

FIG. 6D illustrates a graphical user interface 630 used by the bias detection system 106 to display a frequency heat map 634 indicating frequencies of digital actions selected by the user across sessions for a task on a client device 632 in accordance with one or more embodiments. As shown in FIG. 6D, the bias detection system 106 for provides, for display within the graphical user interface 630, a frequency key 636 that provides an association between a given frequency and a color (or hue, shade, etc.) that is presented within the frequency heat map 634.

FIG. 7 illustrates a graphical user interface 700 used by the bias detection system 106 to display a visual indication 706 of an action-selection bias of a user on a client device 702 based on the user selecting digital actions consistent with the action-selection bias in accordance with one or more embodiments. For example, as shown in FIG. 7, the graphical user interface 700 includes a plurality of digital actions 704a-704d that can be selected by a user. Though FIG. 7 illustrates a particular number of digital actions, it should be noted that the graphical user interface 700 can include additional digital actions that are not shown.

The bias detection system 106 can receive indications of selections of one or more digital actions as the user selects digital actions for a session for a task. In one or more embodiments, the bias detection system 106 tracks the sequence of digital actions selected by the user. Accordingly, the bias detection system 106 can determine that the sequence of digital actions selected by the user for the session for the task are associated with the action-selection bias of the user. For example, the bias detection system 106 can determine that the sequence of digital actions selected by the user up to a certain point in time correspond to one or more digital action sequences that the user was predicted to rely on consistent with the determined action-selection bias of the user. In one or more embodiments, the bias detection system 106 determines that the user is selecting a digital action sequence consistent with an action-selection bias after the user has selected a threshold number of digital actions that are consistent with the action-selection bias of the user.

In response to determining that the user is selecting digital actions consistent with the action-selection bias of the user, the bias detection system 106 can generate and provide the visual indication 706 of the action-selection bias for display within the graphical user interface 700. In particular, the visual indication 706 can include a notification that the user is acting consistent with the determined action-selection bias of the user. In some embodiments, the visual indication 706 can further include direction for the user to select different digital actions to obtain different results and/or obtain new insights.

In one or more embodiments, the bias detection system 106 provides the visual indication 706 via an intelligent agent, such as a virtual assistant. Indeed, in some embodiments, the bias detection system 106 provides an intelligent agent that can provide communications (e.g., answer questions, provide tips) to the user through the graphical user interface. The bias detection system 106 can utilize the intelligent agent to notify the user when the user is selecting digital actions consistent with an action-selection bias.

Thus, the bias detection system 106 introduces a previously-unused and unconventional approach for identifying a bias associated with a user that influences how that user selects digital action sequences to execute a task. Indeed, the bias detection system 106 implements an unconventional ordered combination of steps to analyze digital action sequences corresponding to previous sessions for a task executed by a user, generate session weights that indicate an action-selection bias of the user based on the analysis using a machine learning model, and providing a visual indication of the action-selection bias of the user for display on a graphical user interface. Thus, the bias detection system 106 can inform uses of their action-selection biases and encourage the users to explore other options for executing a task. Further, by utilizing a machine learning model to generate the session weights that are indicative of an action-selection bias, the bias detection system 106 generates values that could not be determined by humans.

By determining action-selection biases of users, the bias detection system 106 can operate more flexibly than conventional systems. Indeed, as previously mentioned, conventional systems were often limited to detecting biases that were inherent to the digital data that to be analyzed or the models used to perform the analysis, failing to account for user-specific biases. The bias detection system 106 flexibly identifies biases that are specific to the way users select digital action for task execution. Further, by utilizing a machine learning model to generate the sessions weights upon which the visual indication of the action-selection bias is based, the bias detection system 106 provides improved scalability with regard to the identification of such biases compared to previous efforts.

Figure 8:
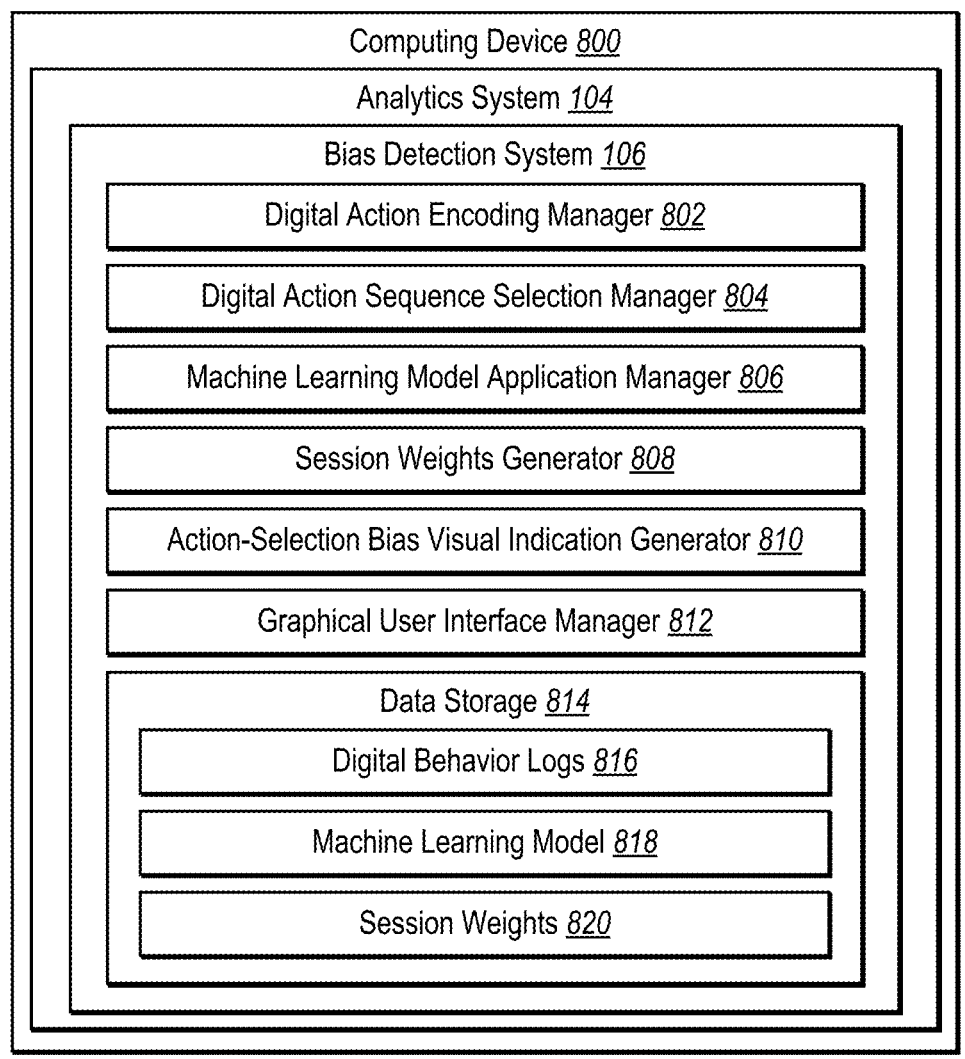
FIG. 8 illustrates an example schematic diagram of a bias detection system in accordance with one or more embodiments.

Turning now to FIG. 8, additional detail will be provided regarding various components and capabilities of the bias detection system 106. In particular, FIG. 8 illustrates the bias detection system 106 implemented by the computing device 800 (e.g., the server(s) 102, the administrator device 110, and/or one of the client devices 114a-114n as discussed above with reference to FIG. 1). Additionally, the bias detection system 106 is also part of the analytics system 104. As shown, the bias detection system 106 can include, but is not limited to, a digital action encoding manager 802, a digital action sequence selection manager 804, a machine learning model application manager 806, a session weights generator 808, an action-selection bias visual indication generator 810, a graphical user interface manager 812, and data storage 814 (which includes digital behavior logs 816, machine learning model 818, and session weights 820).

As just mentioned, and as illustrated in FIG. 8, the bias detection system 106 includes the digital action encoding manager 802. In particular, the digital action encoding manager 802 can encode the digital actions of a digital behavior log corresponding to a user. For example, the digital action encoding manager 802 can generate an encoded digital behavior log corresponding to the digital behavior log of a user by encoding the digital actions stored in the digital behavior log. In one or more embodiments, the digital action encoding manager 802 encodes the digital actions by assigning the digital actions to an action category.

Further, as shown in FIG. 8, the bias detection system 106 includes the digital action sequence selection manager 804. In particular, the digital action sequence selection manager 804 can select digital action sequences from the digital behavior log of a user (e.g., the encoded digital behavior log generated by the digital action encoding manager 802). For example, the digital action sequence selection manager 804 can identify, from the digital behavior log of the user, a task-identifying digital action. The digital action sequence selection manager 804 can further select a first subset of digital actions that chronologically precedes the task-identifying digital action and is within a threshold number of digital actions from the task-identifying digital action as well as a second subset of digital actions that chronologically follows the task-identifying digital action and is within the threshold number of digital actions from the task-identifying digital action.

Additionally, as shown in FIG. 8, the bias detection system 106 includes the machine learning model application manager 806. In particular, the machine learning model application manager 806 can utilize a machine learning model to analyze digital action sequences, such as those identified by the digital action sequence selection manager 804.

As shown in FIG. 8, the bias detection system 106 further includes the session weights generator 808. In particular, the session weights generator 808 can operate in conjunction with the machine learning model application manager 806 to generate session weights that are associated with an action-selection bias of a user. For example, the session weights generator 808 can operate in conjunction with the machine learning model application manager 806 to incorporate a multi-phase process for generating session weights using globalized digital action sequences and personalized digital action sequences. The session weights generator 808 can adjust the session weights of the machine learning model used by the machine learning model application manager 806 to generate session weights that indicate an action-selection bias of a user.

As shown in FIG. 8, the bias detection system 106 also includes the action-selection bias visual indication generator 810. In particular, the action-selection bias visual indication generator 810 can generate a visual indication of an action-selection bias of a user. For example, the action-selection bias visual indication generator 810 can generate graphical representations of the session weights generated by the session weights generator 808, graphical representations of frequencies of digital actions selected by the user (e.g., a frequency heat map), or other visual indications to be provided for display via a graphical user interface.

Additionally, as shown in FIG. 8, the bias detection system 106 includes the graphical user interface manager 812. In particular, the graphical user interface manager 812 can provide graphical components, such as a visual indication of an action-selection bias of a user, for display on a graphical user interface. The graphical user interface manager 812 can further receive indications of user selections, such as an indication of a user selection of a graphical representation of session weights that correspond to a particular user or indications of user selections of digital actions for a session for a task. In one or more embodiments, in response to receiving an indication of a user selection, the graphical user interface manager 812 can provide additional information and/or visual indications, such as an indication that digital actions selected by a user are associated with a determined action-selection bias of the user.

As further shown in FIG. 8, the bias detection system 106 includes data storage 814. In particular, data storage 814 includes digital behavior logs 816, the machine learning model 818, and session weights 820. Digital behavior logs 816 can store the digital behavior logs of a plurality of users. The machine learning model 818 can store the machine learning model used by the machine learning model application manager 806 and the session weights generator 808 to analyze digital action sequences and generate session weights, respectively. For example, the machine learning model 818 can store an attention neural network used to analyze digital action sequences and generate attention weights. The session weights 820 can include the session weights generated by the session weights generator 808.

Each of the components 802-820 of the bias detection system 106 can include software, hardware, or both. For example, the components 802-820 can include one or more instructions stored on a computer-readable storage medium and executable by processors of one or more computing devices, such as a client device or server device. When executed by the one or more processors, the computer-executable instructions of the bias detection system 106 can cause the computing device(s) to perform the methods described herein. Alternatively, the components 802-820 can include hardware, such as a special-purpose processing device to perform a certain function or group of functions. Alternatively, the components 802-820 of the bias detection system 106 can include a combination of computer-executable instructions and hardware.

Furthermore, the components 802-820 of the bias detection system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-820 of the bias detection system 106 may be implemented as a stand-alone application, such as a desktop or mobile application. Furthermore, the components 802-820 of the bias detection system 106 may be implemented as one or more web-based applications hosted on a remote server. Alternatively, or additionally, the components 802-820 of the bias detection system 106 may be implemented in a suite of mobile device applications or "apps." For example, in one or more embodiments, the bias detection system 106 can comprise or operate in connection with digital software applications such as ADOBE® ANALYTICS or ADOBE® EXPERIENCE CLOUD®. "ADOBE" and "EXPERIENCE CLOUD" are either registered trademarks or trademarks of Adobe Inc. in the United States and/or other countries.

Figure 9:
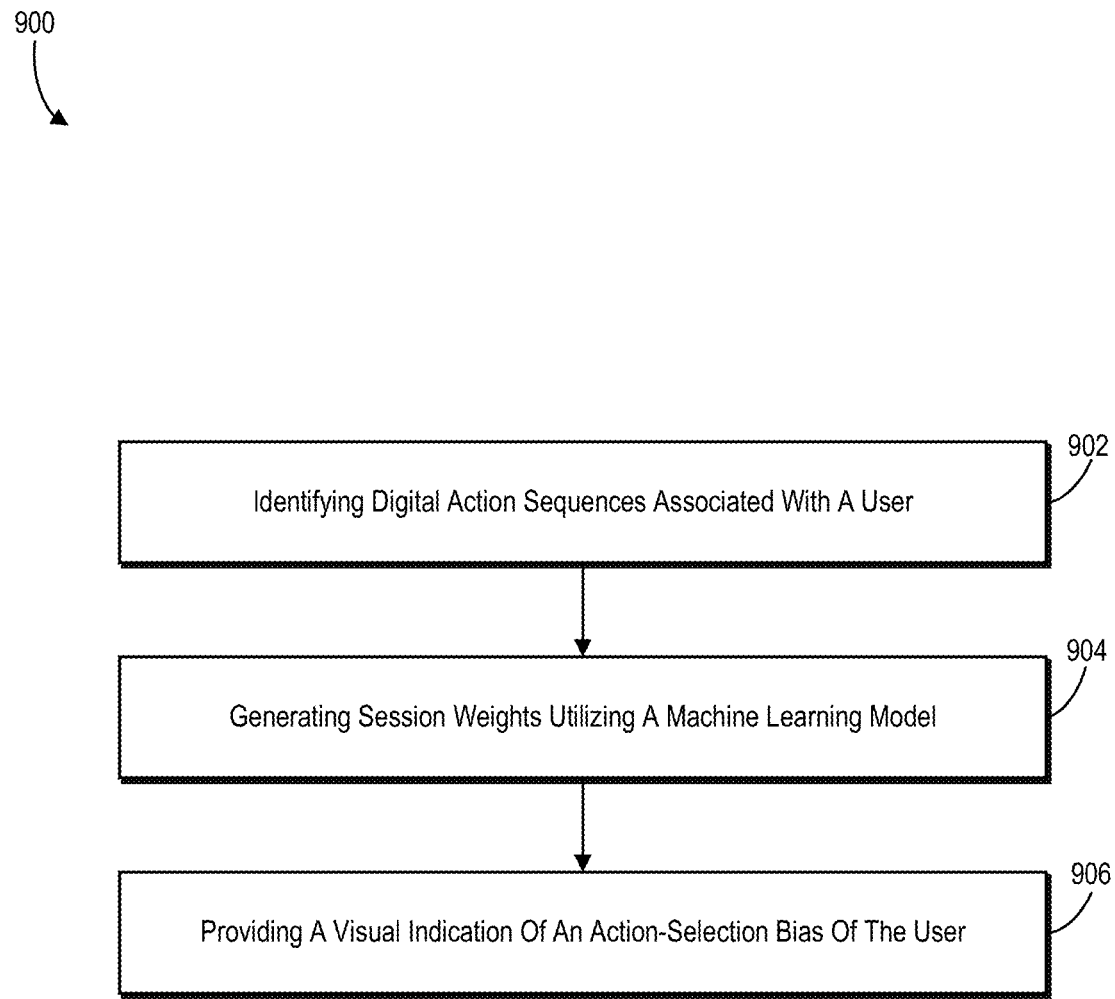
FIG. 9 illustrates a flowchart of a series of acts for generating a visual indication of an action-selection bias of a user in accordance with one or more embodiments.

FIGS. 1-8, the corresponding text and the examples provide a number of different methods, systems, devices, and non-transitory computer-readable media of the bias detection system 106. In addition to the foregoing, one or more embodiments can also be described in terms of flowcharts comprising acts for accomplishing the particular results as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

As mentioned, FIG. 9 illustrates a flowchart of a series of acts 900 for generating a visual indication of an action-selection bias of a user in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. For example, in some embodiments, the acts of FIG. 9 can be performed as part of a computer-implemented method for determining biases in task actions. Alternatively, a non-transitory computer-readable medium can store instructions thereon that, when executed by at least one processor, cause a computing device to perform the acts of FIG. 9. In some embodiments, a system can perform the acts of FIG. 9. For example, in one or more embodiments, a system includes at least one memory device comprising a digital behavior log for one or more tasks executed by a user and an attention neural network. The system can further include at least one server device configured to cause the system to perform the acts of FIG. 9.

The series of acts 900 includes an act 902 of identifying digital action sequences associated with a user. For example, the act 902 can involve identifying, from a digital behavior log corresponding to a user, a set of digital action sequences corresponding to sessions for a task executed by the user. In particular, the act 902 can involve identifying, from a digital behavior log corresponding to a user, a set of digital action sequences corresponding to a set of sessions for a task executed by the user.

In one or more embodiments, identifying the set of digital action sequences corresponding to the sessions for the task include identifying, within the digital behavior log corresponding to the user, a set of task-identifying digital actions that correspond to the task; and selecting, from within the digital behavior log, a set of digital actions from within a threshold number of digital actions of each task-identifying digital action.

To illustrate, in one or more embodiments, identifying the set of digital action sequences corresponding to the set of sessions for the task comprises, for a session for the task executed by the user: identifying, within the digital behavior log corresponding to the user, a task-identifying digital action corresponding to the task; selecting, from within the digital behavior log, a first subset of digital actions that chronologically precedes the task-identifying digital action and is within a threshold number of digital actions from the task-identifying digital action; and selecting, from within the digital behavior log, a second subset of digital actions that chronologically follows the task-identifying digital action and is within the threshold number of digital actions from the task-identifying digital action.

The series of acts 900 also includes an act 904 of generating session weights utilizing a machine learning model. For example, the act 904 can involve generating, utilizing a machine learning model, session weights indicating an extent a future session for the task is predicted to be influenced by the set of sessions. In some instances, generating the session weights comprises generating, utilizing the machine learning model, the session weights indicating an extent the future session for the task is predicted to be influenced by a frequency of digital actions within one or more of the set of sessions. In one or more embodiments, generating the session weights utilizing the machine learning model comprises generating, utilizing the machine learning model, a predicted digital action sequence corresponding to the future session for the task; and generating the session weights based on a comparison of the predicted digital action sequence with an observed digital action sequence corresponding to the future session for the task. In some embodiments, the bias detection system 106 further generates the session weights utilizing the machine learning model by identifying, within the digital behavior log, a subsequent future session for the task among a set of rolling windows of sessions that progressively follow the set of sessions for the task; generating, utilizing the machine learning model, an additional predicted digital action sequence for the task corresponding to the subsequent future session for the task; and adjusting the session weights based on a comparison of the additional predicted digital action sequence with an additional observed digital action sequence corresponding to the subsequent future session for the task.

Further, the series of acts 900 includes an act 906 of providing a visual indication of an action-selection bias of a user. For example, the act 906 can involve providing, for display on a graphical user interface, a visual indication of an action-selection bias of the user for the task based on the session weights. In other words, the bias detection system 106 can generate a graphical user interface comprising a visual indication of an action-selection bias corresponding to the user for the task based on the session weights. In one or more embodiments, the visual indication of the action-selection bias corresponding to the user for the task comprises a graphical representation of the session weights.

In one or more embodiments, providing the visual indication of the action-selection bias of the user comprises generating a graphical indication of an anchoring bias by which an earlier session for the task influences a digital action sequence in the future session for the task more than a later session for the task. In some embodiments, providing the visual indication of the action-selection bias of the user comprises generating a graphical indication of a recency bias by which a later session for the task influences a digital action sequence in the future session for the task more than an earlier session for the task. In some instances, providing the visual indication of the action-selection bias of the user comprises generating a graphical representation of the session weights.

In one or more embodiments, the bias detection system 106 receives, from a client device associated with the user, one or more digital actions corresponding to a session for the task; determines that the one or more digital actions are associated with the action-selection bias of the user; and provides the visual indication of the action-selection bias of the user based on determining that the one or more digital actions are associated with the action-selection bias of the user.

In some embodiments, the bias detection system 106 provides, for display on the graphical user interface, the visual indication of the action-selection bias of the user for the task with a set of visual indications of action-selection biases of a set of users; receives, via the graphical user interface, a user selection of the visual indication of the action-selection bias of the user; and provides, for display on the graphical user interface, a graphical representation of frequencies of digital actions selected by the user across the set of sessions.

In one or more embodiments, the series of acts 900 includes acts for more particularly generating a visual indication of an action-selection bias of a user based on attention weights generated using an attention neural network. For example, in one or more embodiments, the acts include identifying, from the digital behavior log, a set of digital action sequences corresponding to a set of sessions for a task from the one or more tasks; generating, utilizing the attention neural network, a predicted digital action sequence corresponding to a subsequent session for the task; extracting, from the attention neural network, attention weights indicating an extent the subsequent session for the task is predicted to be influenced by the set of sessions; and providing, for display on a graphical user interface, a graphical representation of the attention weights depicting an action-selection bias of the user for the task.

In one or more embodiments, the bias detection system 106 generates the predicted digital action sequence corresponding to the subsequent session for the task by generating, utilizing an action-level encoder of the attention neural network, a set of action-level context vectors corresponding to the set of sessions; generating, utilizing a session-level encoder of the attention neural network, a session-level context vector based on the set of action-level context vectors; and generating, utilizing a decoder of the attention neural network, the predicted digital action sequence based on the session-level context vector. In some embodiments, the bias detection system 106 further identifies a set of attention weights corresponding to an attention mechanism of the session-level encoder; adjusts the set of attention weights based on a comparison of the predicted digital action sequence with an observed digital action sequence corresponding to the subsequent session for the task; and extracts the attention weights by extracting the adjusted set of attention weights from the attention mechanism of the session-level encoder.

In some embodiments, the bias detection system 106 generates, utilizing the attention neural network, baseline attention weights based on digital action sequences corresponding to sessions for the task executed by a set of users; and generates, utilizing the attention neural network, the attention weights based on the baseline attention weights and the set of digital action sequences corresponding to the user.

In one or more embodiments, providing the graphical representation of the attention weights can include generating a graphical representation of an anchoring bias by which earlier sessions for the task are associated with greater attention weights than later sessions for the task. In some embodiments, providing the graphical representation of the attention weights includes generating a graphical representation of a recency bias by which later sessions for the task are associated with greater attention weights than earlier sessions for the task. In some instances, providing the graphical representation of the attention weights includes generating a graphical representation of changes to the attention weights across a set of rolling windows of sessions for the task that correspond to the user.

In one or more embodiments, the bias detection system 106 provides, for display on the graphical user interface, the graphical representation of the attention weights depicting the action-selection bias of the user together with graphical representations of sets of attention weights corresponding to a set of users; receives, via the graphical user interface, a user selection of the graphical representation of the attention weights depicting the action-selection bias of the user; and provides, for display on the graphical user interface, a frequency heat map indicating frequencies of digital actions selected by the user across the set of sessions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
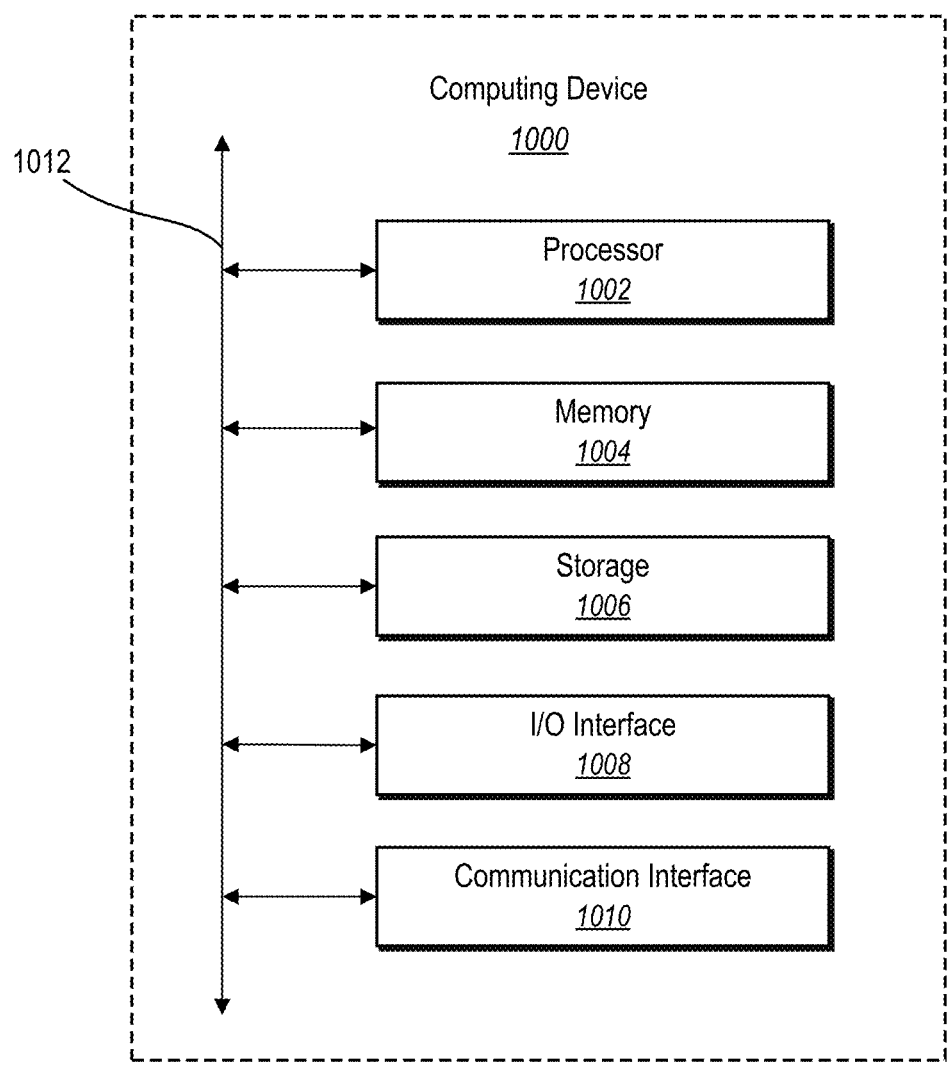
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102, the administrator device 110, and/or the client devices 114a-114n). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause the at least one processor to perform operations comprising:
   identifying, from a digital behavior log corresponding to a user, a set of digital action sequences corresponding to a set of sessions for a task executed by the user, each digital action sequence comprising a task-identifying digital action, a first subset of digital actions that chronologically precedes the task-identifying digital action, and a second subset of digital actions that chronologically follows the task-identifying digital action;
   generating, utilizing a machine learning model, session weights indicating a predicted influence of the set of sessions for the task on a future session for the task; and
   providing, for display on a graphical user interface, a visual indication of an action-selection bias of the user for the task based on the session weights.

2. The non-transitory computer-readable medium of claim 1, wherein providing the visual indication of the action-selection bias comprises generating a graphical indication of an anchoring bias by which an earlier session for the task influences a digital action sequence in the future session for the task more than a later session for the task.

3. The non-transitory computer-readable medium of claim 1, wherein providing the visual indication of the action-selection bias comprises generating a graphical indication of a recency bias by which a later session for the task influences a digital action sequence in the future session for the task more than an earlier session for the task.

4. The non-transitory computer-readable medium of claim 1, further comprising instructions that, when executed by the at least one processor, cause the at least one processor to perform operations comprising:
   receiving, from a client device associated with the user, one or more digital actions corresponding to a session for the task;
   determining that the one or more digital actions are associated with the action-selection bias of the user; and
   providing the visual indication of the action-selection bias of the user based on determining that the one or more digital actions are associated with the action-selection bias of the user.

5. The non-transitory computer-readable medium of claim 1, wherein providing the visual indication of the action-selection bias of the user comprises generating a graphical representation of the session weights.

6. The non-transitory computer-readable medium of claim 1, further comprising instructions that, when executed by the at least one processor, cause the at least one processor to perform operations comprising:
   providing, for display on the graphical user interface, the visual indication of the action-selection bias of the user for the task with a set of visual indications of action-selection biases of a set of users;
   receiving, via the graphical user interface, a user selection of the visual indication of the action-selection bias of the user; and
   providing, for display on the graphical user interface, a graphical representation of frequencies of digital actions selected by the user across the set of sessions.

7. The non-transitory computer-readable medium of claim 1, wherein identifying each digital action sequence comprises:
   identifying, within the digital behavior log corresponding to the user, the task-identifying digital action corresponding to the task;
   selecting, from within the digital behavior log, the first subset of digital actions by selecting digital actions that chronologically precede the task-identifying digital action and are within a threshold number of digital actions from the task-identifying digital action; and
   selecting, from within the digital behavior log, the second subset of digital actions by selecting digital actions that chronologically follow the task-identifying digital action and are within the threshold number of digital actions from the task-identifying digital action.

8. The non-transitory computer-readable medium of claim 1, wherein generating the session weights utilizing the machine learning model comprises:
   generating, utilizing the machine learning model, a predicted digital action sequence corresponding to the future session for the task; and
   generating the session weights based on a comparison of the predicted digital action sequence with an observed digital action sequence corresponding to the future session for the task.

9. The non-transitory computer-readable medium of claim 8, wherein generating the session weights utilizing the machine learning model comprises:
   identifying, within the digital behavior log, a subsequent future session for the task among a set of rolling windows of sessions that progressively follow the set of sessions for the task;
   generating, utilizing the machine learning model, an additional predicted digital action sequence for the task corresponding to the subsequent future session for the task; and
   adjusting the session weights based on a comparison of the additional predicted digital action sequence with an additional observed digital action sequence corresponding to the subsequent future session for the task.

10. The non-transitory computer-readable medium of claim 1, wherein generating the session weights indicating the predicted influence of the set of sessions for the task on the future session for the task comprises generating, utilizing the machine learning model, the session weights indicating a predicted influence of a frequency of digital actions within one or more sessions from the set of sessions on the future session for the task.

11. A system comprising:
   at least one memory device comprising a digital behavior log for one or more tasks executed by a user and an attention neural network; and
   at least one server device configured to cause the system to:
      identify, from the digital behavior log, a set of digital action sequences corresponding to a set of sessions for a task from the one or more tasks, each digital action sequence comprising a task-identifying digital action, a first subset of digital actions that chronologically precedes the task-identifying digital action, and a second subset of digital actions that chronologically follows the task-identifying digital action;

generate, utilizing the attention neural network, a predicted digital action sequence corresponding to a subsequent session for the task;

extract, from the attention neural network, attention weights indicating a predicted influence of the set of sessions for the task on the subsequent session for the task; and provide, for display on a graphical user interface, a graphical representation of the attention weights depicting an action-selection bias of the user for the task.

12. The system of claim 11, wherein the at least one server device is further configured to cause the system to provide the graphical representation of the attention weights by generating a graphical representation of an anchoring bias by which earlier sessions for the task are associated with greater attention weights than later sessions for the task.

13. The system of claim 11, wherein the at least one server device is further configured to cause the system to provide the graphical representation of the attention weights by generating a graphical representation of a recency bias by which later sessions for the task are associated with greater attention weights than earlier sessions for the task.

14. The system of claim 11, wherein the at least one server device is further configured to cause the system to provide the graphical representation of the attention weights by generating a graphical representation of changes to the attention weights across a set of rolling windows of sessions for the task that correspond to the user.

15. The system of claim 11, wherein the at least one server device is further configured to cause the system to:

provide, for display on the graphical user interface, the graphical representation of the attention weights depicting the action-selection bias of the user together with graphical representations of sets of attention weights corresponding to a set of users;

receive, via the graphical user interface, a user selection of the graphical representation of the attention weights depicting the action-selection bias of the user; and provide, for display on the graphical user interface, a frequency heat map indicating frequencies of digital actions selected by the user across the set of sessions.

16. The system of claim 11, wherein the at least one server device is further configured to cause the system to generate the predicted digital action sequence corresponding to the subsequent session for the task by:

generating, utilizing an action-level encoder of the attention neural network, a set of action-level context vectors corresponding to the set of sessions;

generating, utilizing a session-level encoder of the attention neural network, a session-level context vector based on the set of action-level context vectors; and generating, utilizing a decoder of the attention neural network, the predicted digital action sequence based on the session-level context vector.

17. The system of claim 16, wherein the at least one server device is further configured to cause the system to:

identify a set of attention weights corresponding to an attention mechanism of the session-level encoder;

adjust the set of attention weights based on a comparison of the predicted digital action sequence with an observed digital action sequence corresponding to the subsequent session for the task; and extract the attention weights by extracting the adjusted set of attention weights from the attention mechanism of the session-level encoder.

18. The system of claim 11, wherein the at least one server device is further configured to cause the system to:

generate, utilizing the attention neural network, baseline attention weights based on digital action sequences corresponding to sessions for the task executed by a set of users; and generate, utilizing the attention neural network, the attention weights based on the baseline attention weights and the set of digital action sequences corresponding to the user.

19. A computer-implemented method comprising:

identifying, from a digital behavior log corresponding to a user, a set of digital action sequences corresponding to sessions for a task executed by the user, each digital action sequence comprising a task-identifying digital action, a first subset of digital actions that chronologically precedes the task-identifying digital action, and a second subset of digital actions that chronologically follows the task-identifying digital action;

performing a step for determining session weights for the sessions utilizing a machine learning model; and generating a graphical user interface comprising a visual indication of an action-selection bias corresponding to the user for the task based on the session weights, the session weights indicating a predicted influence of the sessions for the task on a future session for the task.

20. The computer-implemented method of claim 19, wherein identifying the set of digital action sequences corresponding to the sessions for the task comprises:

identifying, within the digital behavior log corresponding to the user, a set of task-identifying digital actions that correspond to the task; and selecting, from within the digital behavior log, a set of digital actions from within a threshold number of digital actions of each task-identifying digital action.

* * * * *